(12) United States Patent
Kuhara et al.

(10) Patent No.: US 12,111,657 B2
(45) Date of Patent: Oct. 8, 2024

(54) UNMANNED AERIAL VEHICLE, INFORMATION PROCESSING METHOD, AND RECORDING MEDIUM

(71) Applicant: Panasonic Intellectual Property Management Co., Ltd., Osaka (JP)

(72) Inventors: Shunsuke Kuhara, Osaka (JP); Kazunobu Konishi, Osaka (JP); Stephen William John, Nara (JP); Katsuhiko Asai, Nara (JP); Kazuo Inoue, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 750 days.

(21) Appl. No.: 17/204,410

(22) Filed: Mar. 17, 2021

(65) Prior Publication Data
US 2021/0200201 A1 Jul. 1, 2021

Related U.S. Application Data

(63) Continuation of application No. PCT/JP2019/036903, filed on Sep. 20, 2019.

(30) Foreign Application Priority Data

Feb. 19, 2019 (JP) .................................. 2019-027617

(51) Int. Cl.
*G05D 1/00* (2024.01)
*B64U 10/14* (2023.01)
(Continued)

(52) U.S. Cl.
CPC .............. *G05D 1/005* (2013.01); *G10L 25/48* (2013.01); *H04R 1/32* (2013.01); *B64U 10/14* (2023.01);
(Continued)

(58) Field of Classification Search
CPC ....... G05D 1/005; B64C 39/024; G10L 25/48; G10L 25/21; H04R 1/32; H04R 2440/00;
(Continued)

(56) References Cited

U.S. PATENT DOCUMENTS

| 2005/0041839 A1 | 2/2005 | Saitou et al. |
| 2006/0129275 A1 | 6/2006 | Ogawa et al. |

(Continued)

FOREIGN PATENT DOCUMENTS

| JP | 2005-65021 | 3/2005 |
| JP | 2006-167838 | 6/2006 |

(Continued)

OTHER PUBLICATIONS

International Search Report (ISR) issued on Dec. 17, 2019 in International (PCT) Application No. PCT/JP2019/036903.

(Continued)

*Primary Examiner* — Isaac G Smith
*Assistant Examiner* — Nikki Marie M Molina
(74) *Attorney, Agent, or Firm* — WENDEROTH, LIND & PONACK, L.L.P.

(57) ABSTRACT

An unmanned aerial vehicle includes: a sensor including at least a microphone that generates sound data; and a processor. The processor determines a quality of a target sound by using the sound data generated by the microphone, acquires a positional relationship between the unmanned aerial vehicle and a sound source of the target sound by using data generated by the sensor, determines a destination to which the sound source is to move based on the quality of the target sound and the positional relationship, and presents target movement information that prompts the sound source to move toward the destination.

18 Claims, 29 Drawing Sheets

(51) Int. Cl.
*B64U 101/30* (2023.01)
*G10L 25/48* (2013.01)
*H04R 1/32* (2006.01)

(52) U.S. Cl.
CPC ...... *B64U 2101/30* (2023.01); *B64U 2201/00* (2023.01); *B64U 2201/104* (2023.01); *H04R 2440/00* (2013.01)

(58) Field of Classification Search
CPC .... H04R 2410/01; H04R 1/326; H04R 1/028; H04R 1/1083; H04R 1/406; H04R 3/005; B64U 2201/00
See application file for complete search history.

(56) References Cited

U.S. PATENT DOCUMENTS

| | | |
|---|---|---|
| 2006/0143017 A1 | 6/2006 | Sonoura et al. |
| 2016/0063987 A1 | 3/2016 | Xu et al. |
| 2016/0127641 A1 | 5/2016 | Gove |
| 2017/0220036 A1* | 8/2017 | Visser ................. H04R 29/004 |
| 2017/0249939 A1* | 8/2017 | Brooks .................. G10L 15/24 |
| 2017/0341746 A1* | 11/2017 | Erickson ............... B64C 39/024 |
| 2018/0234612 A1 | 8/2018 | Kunkel et al. |
| 2019/0141445 A1* | 5/2019 | Wu ..................... G10L 21/0208 |

FOREIGN PATENT DOCUMENTS

| | | |
|---|---|---|
| JP | 2006-181651 | 7/2006 |
| JP | 2017-502568 | 1/2017 |
| JP | 2017-76084 | 4/2017 |
| WO | 2016/029469 | 3/2016 |
| WO | 2018/230539 | 12/2018 |

OTHER PUBLICATIONS

Extended European Search Report issued Mar. 18, 2022 in corresponding European Patent Application No. 19915750.4.

* cited by examiner

FIG. 8
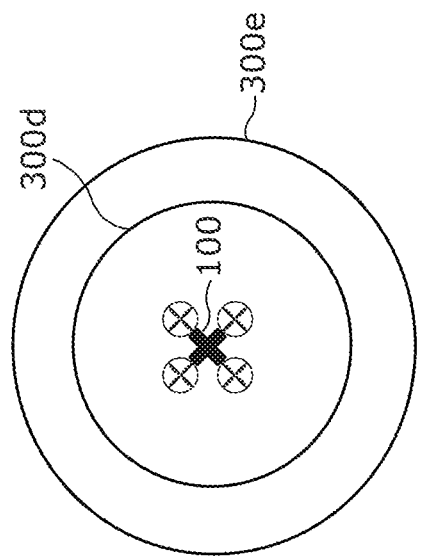
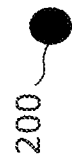

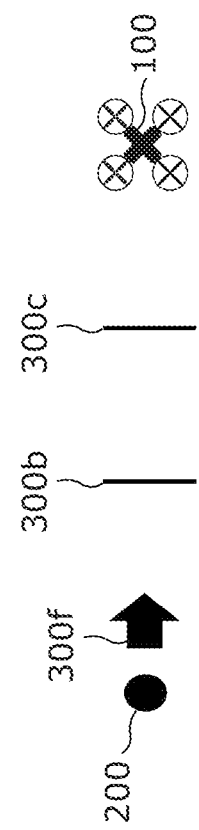

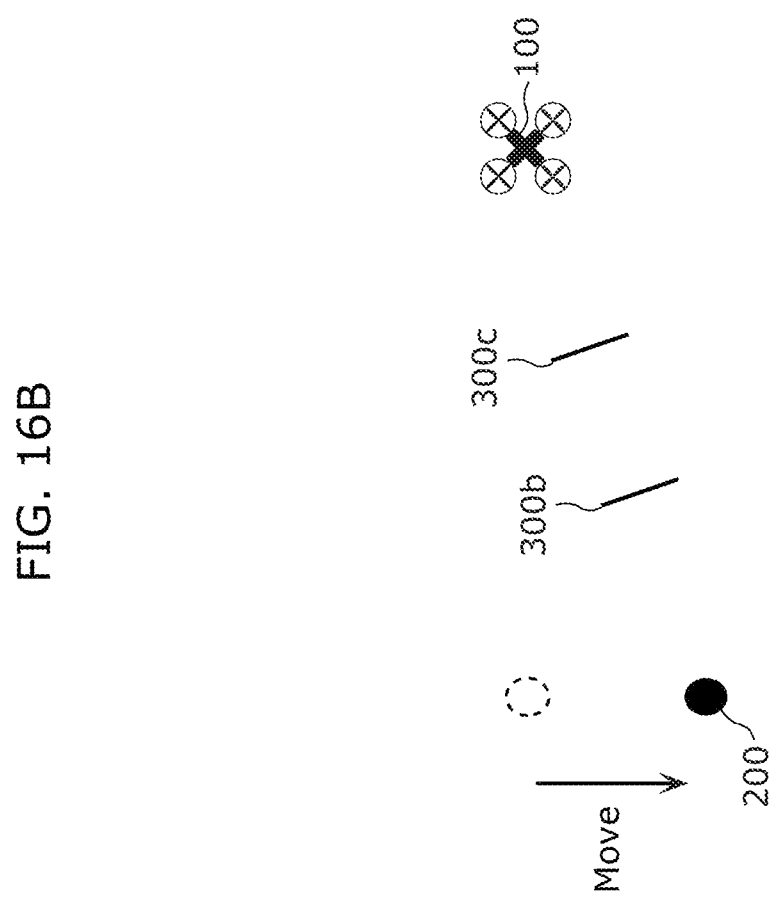

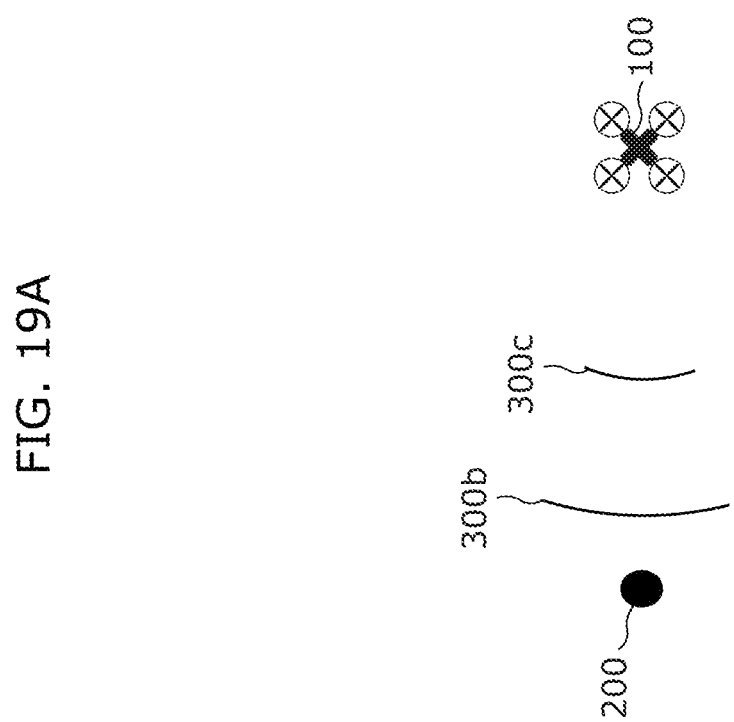

UNMANNED AERIAL VEHICLE, INFORMATION PROCESSING METHOD, AND RECORDING MEDIUM

CROSS REFERENCE TO RELATED APPLICATIONS

This is a continuation application of PCT International Application No. PCT/JP2019/036903 filed on Sep. 20, 2019, designating the United States of America, which is based on and claims priority of Japanese Patent Application No. 2019-027617 filed on Feb. 19, 2019. The entire disclosures of the above-identified applications, including the specifications, drawings and claims are incorporated herein by reference in their entirety.

FIELD

The present disclosure relates to an unmanned aerial vehicle, an information processing method, and a recording medium.

BACKGROUND

Patent Literature (PTL) 1 discloses an unmanned aircraft that performs processing of removing background noise from sound data collected by a background microphone.

CITATION LIST

Patent Literature

PTL 1: Japanese Unexamined Patent Application Publication (Translation of PCT Application) No. 2017-502568

SUMMARY

Technical Problem

However, with the technique disclosed in PTL 1, no consideration is given to the safety of the sound source, and thus it may be difficult to improve the quality of collected sound while ensuring the safety.

In order to address this problem, the present disclosure provides an unmanned aerial vehicle, an information processing method, and a recording medium, with which the quality of collected sound can be improved while ensuring the safety of the sound source.

Solution to Problem

An unmanned aerial vehicle according to the present disclosure is an unmanned aerial vehicle including: a sensor including at least a microphone that generates sound data; and a processor, wherein the processor performs: determining a quality of a target sound by using the sound data generated by the microphone; acquiring a positional relationship between the unmanned aerial vehicle and a sound source of the target sound by using data generated by the sensor; determining a destination to which the sound source is to move based on the quality of the target sound and the positional relationship; and presenting target movement information that prompts the sound source to move toward the destination.

Generic or specific aspects of the present disclosure may be implemented by a system, a method, an integrated circuit, a computer program or a computer readable recording medium such as a CD-ROM, or may be implemented by any combination of a system, a method, an integrated circuit, a computer program and a recording medium.

Advantageous Effects

With the unmanned aerial vehicle, the information processing method, and the recording medium according to the present disclosure, the quality of collected sound can be improved while ensuring the safety of the sound source.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a diagram showing another example of information that is presented as target movement information and indicates the boundaries of a region in which the quality of the target sound is a targeted quality level or a level higher than the targeted quality level and the safety of the sound source is ensured.

FIG. 9 is a diagram showing an example of information that is presented as target movement information and indicates a direction of movement to a destination.

FIG. 10 is a diagram showing an example of information that is presented as target movement information and indicates a moving route to the destination.

FIG. 16B is a diagram illustrating the fourth example of the method for presenting the target movement information according to the position of the human.

FIG. 19A is a diagram illustrating a seventh example of a method for presenting the target movement information according to the position of the human.

Figure 1:
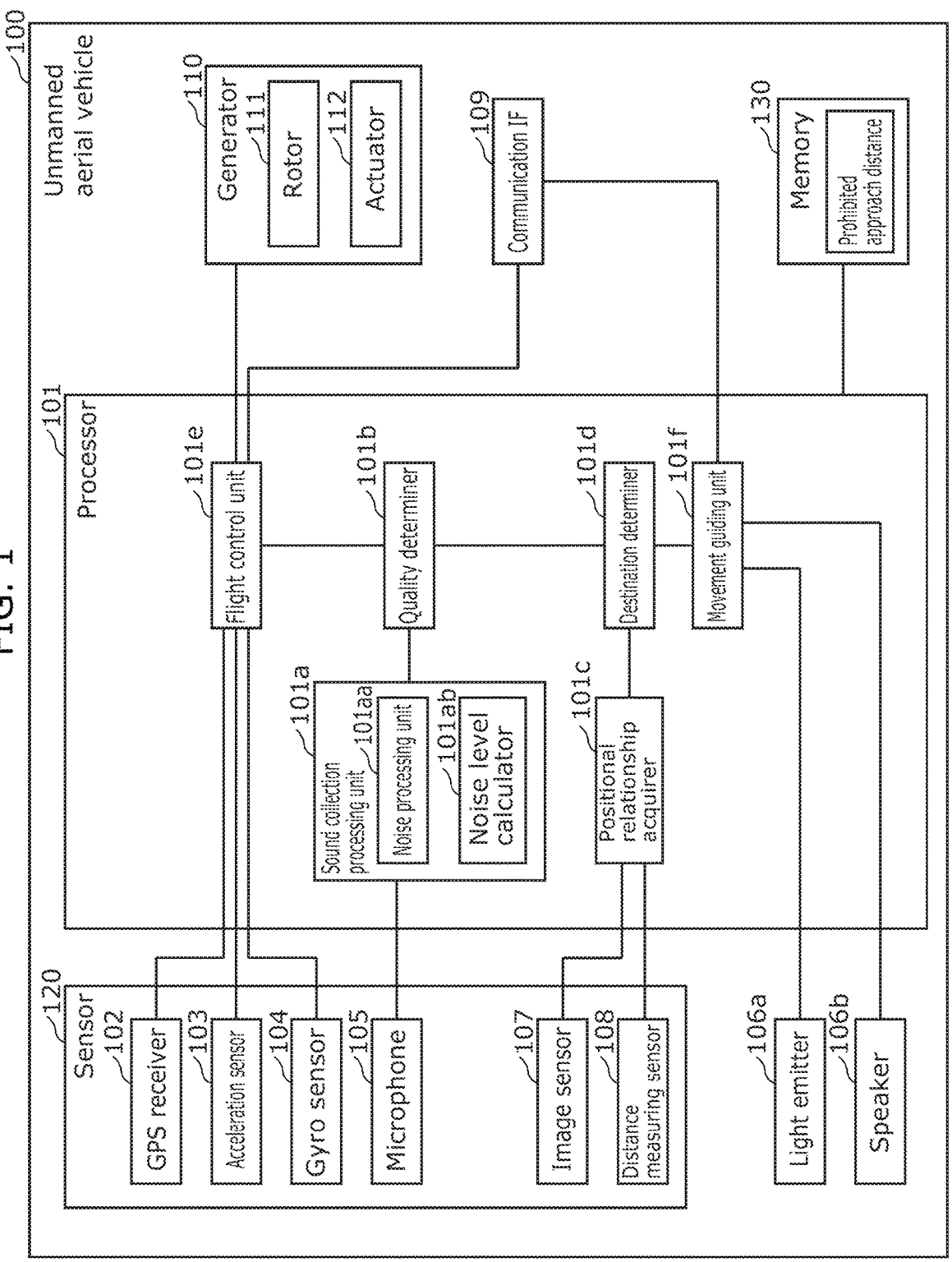
FIG. 1 is a block diagram showing an example of a configuration of an unmanned aerial vehicle according to an embodiment.

DESCRIPTION OF EMBODIMENTS (Underlying Knowledge Forming Basis of the Present Disclosure)

As described above, the unmanned aircraft disclosed in PTL 1 performs the processing of removing the background noise generated from a propulsion unit, such as a rotor, included in the unmanned aircraft from the collected sound data. However, with the unmanned aircraft, no consideration is given to the relative positional relationship between the unmanned aircraft and the sound source from which the sound data is collected. For this reason, a situation may occur where the sound source is not present within a sound collection range that is the range where a sound collecting microphone that is included in the unmanned aircraft and that detects a target sound from the sound source can effectively collect the sound. As described above, if the sound source is not present within the sound collection range of the sound collecting microphone, the sound collecting microphone cannot effectively collect the target sound, as a result of which, the sound collecting microphone collects more background noise rather than the target sound. Accordingly, in the sound data obtained by the sound collecting microphone, the noise component accounts for a relatively large proportion, and thus the quality of collected sound (for example, the SN ratio (signal-to-noise ratio) of the sound collection data) decreases. Thus, even if the obtained sound data is subjected to the background noise removing processing, it is difficult to obtain high-quality sound data.

Accordingly, in order to collect more target sound from the sound source rather than the background noise, the unmanned aircraft may be controlled to approach the sound source so as to collect the sound data. In the case where the unmanned aircraft is moved to approach the sound source so as to collect the sound data at a position close to the sound source, if the unmanned aircraft goes out of control, or if there is a trouble with an actuator of the unmanned aircraft that generates a propulsion force, the unmanned aircraft may fall to the sound source. For this reason, it is necessary to ensure safety of the sound source by taking safety measures such as, for example, covering the sound source with a protective net. That is, it is difficult to ensure the safety of the sound source without spending an additional energy or cost for producing and installing the protective net. Also, because the flight noise of the unmanned aircraft is large, and the rotor rotates at a high speed, the unmanned aircraft may give a sensation of pressure to humans. The sound source (for example, a human) cannot be aware of how close the unmanned aircraft will approach the sound source, and thus the sound source may feel scared of the unmanned aircraft when it is approaching.

In order to solve the problem described above, an unmanned aerial vehicle according to an aspect of the present disclosure is an unmanned aerial vehicle including: a sensor including at least a microphone that generates sound data; and a processor, wherein the processor performs: determining a quality of a target sound by using the sound data generated by the microphone; acquiring a positional relationship between the unmanned aerial vehicle and a sound source of the target sound by using data generated by the sensor; determining a destination to which the sound source is to move based on the quality of the target sound and the positional relationship; and presenting target movement information that prompts the sound source to move toward the destination.

For example, if the unmanned aerial vehicle is configured to simply prompt the sound source to approach the unmanned aerial vehicle when the quality of the target sound is low, the sound source cannot be aware of how close the sound source should approach the unmanned aerial vehicle, which may result in a situation where the sound source is too close to the unmanned aerial vehicle and collides with the unmanned aerial vehicle. Alternatively, a situation may occur where because the sound source cannot be aware of how close the sound source should approach the unmanned aerial vehicle, the sound source stops moving before arriving at the position at which the quality of collected sound can be improved. In contrast, according to the present disclosure, a destination to which the sound source is to move is determined based on the quality of the target sound and the positional relationship between the unmanned aerial vehicle and the sound source, and the sound source is prompted to move toward the destination. That is, the sound source is prompted to move toward the specific target destination rather than to simply approach the unmanned aerial vehicle, and it is therefore possible to suppress a situation where the sound source is too close to the unmanned aerial vehicle and exposed to danger, or a situation where the sound source is not so close to the unmanned aerial vehicle and the quality of collected sound decreases. As described above, the quality of collected sound can be improved while ensuring the safety of the sound source.

Also, when the quality of the target sound is lower than a targeted quality level that is predetermined, the processor may present the target movement information that informs the sound source to approach the unmanned aerial vehicle.

With this configuration, when the quality of the target sound is lower than the predetermined targeted quality level, the sound source is prompted to move toward the destination and approach the unmanned aerial vehicle, and thus the quality of collected sound can be improved.

Also, the processor may further perform: acquiring distance information that indicates a predetermined distance from the unmanned aerial vehicle; and determining, based on the distance information and the quality of the target sound, the target movement information to prevent the sound source from approaching the unmanned aerial vehicle beyond a position spaced apart from the unmanned aerial vehicle by the predetermined distance.

With this configuration, it is possible to prompt the sound source to not approach the unmanned aerial vehicle beyond the predetermined distance indicated by the distance information, and thus safety of the sound source can be ensured.

Also, the processor may determine, based on (i) the quality of the target sound, (ii) the positional relationship, and (iii) the distance information, the destination that is spaced apart from the unmanned aerial vehicle by the predetermined distance or more.

With this configuration, a position within the predetermined distance from the unmanned aerial vehicle is not determined as the destination, and thus safety of the sound source can be ensured.

Also, the unmanned aerial vehicle may further include an actuator that changes at least one of a direction of the microphone and an amount of protrusion of the microphone from the unmanned aerial vehicle to outside, and when the quality of the target sound is lower than the targeted quality level even after the sound source has moved to the destination, the processor may change at least one of the direction of the microphone and the amount of protrusion of the microphone.

With this configuration, the quality of collected sound can be improved by changing the direction of the microphone or changing the amount of protrusion of the microphone without, for example, prompting the sound source to further move or change the voice volume.

Also, when the quality of the target sound is lower than a targeted quality level that is predetermined even after the sound source has moved to the destination, or when the sound source cannot move toward the destination, the processor may present voice volume change information that prompts the sound source to change a voice volume.

With this configuration, even in the case where the quality of collected sound is low despite the fact that the sound source has moved to the destination, or even in the case where the quality of collected sound is low because the sound source cannot move to the destination, by prompting the sound source to change the voice volume (specifically, by prompting the sound source to speak loudly), the quality of collected sound can be improved.

Also, when the quality of the target sound is higher than a targeted quality level that is predetermined, the processor may present the target movement information that informs the sound source to move away from the unmanned aerial vehicle.

With this configuration, from the viewpoint of safety, the sound source may be positioned as far away as possible from the unmanned aerial vehicle. Accordingly, in the case where the quality of the target sound is higher than the targeted quality level, and the quality of collected sound is sufficient, safety can be further enhanced by causing the sound source to move away from the unmanned aerial vehicle.

Also, the destination may include a position or a region where the quality of the target sound after the sound source has moved to the destination reaches a targeted quality level that is predetermined or a level higher than the targeted quality level.

With this configuration, the quality of the target sound can reach a targeted quality level that is predetermined or a level higher than the targeted quality level as a result of the sound source being prompted to move toward the destination and moving to the destination, and thus the quality of collected sound can be improved.

Also, the destination may include a position or a region where the quality of the target sound after the sound source has moved to the destination reaches a targeted quality level that is predetermined or a level higher than the targeted quality level, the position or the region being spaced apart from the unmanned aerial vehicle by a predetermined distance.

With this configuration, a position or a region within the distance from the unmanned aerial vehicle that is the distance beyond which the sound source is prohibited to move closer to the unmanned aerial vehicle is not included as the destination, and thus the quality of collected sound can be improved while ensuring safety.

Also, the target movement information may include information for guiding the sound source to the destination.

With this configuration, the sound source can move to the destination without getting lost.

Also, the target movement information may include information that indicates a direction of movement from a current position of the sound source to the destination.

With this configuration, the sound source is guided by the presented information that indicates the direction of movement, and thus can move to the destination without getting lost.

Also, the target movement information may include information that indicates a moving route to the destination of the sound source.

With this configuration, the sound source is guided by the presented information that indicates the moving route, and thus can move to the destination without getting lost.

Also, the target movement information may include information that indicates whether or not the sound source has moved to the destination.

With this configuration, the sound source can recognize whether or not the sound source has moved to the destination by being guided by the information that indicates whether or not the sound source has moved to the destination.

Also, the processor may cause a presentation device that is provided external to the unmanned aerial vehicle to present the target movement information through communication.

With this configuration, the sound source can move toward the destination while checking the presentation device such as a portable terminal owned by the sound source.

Also, the processor may recognize an environment and present the target movement information by using a presentation means suitable for the environment.

There is a presentation means that cannot be easily recognized by the sound source depending on the environment. However, with this configuration, the target movement information is presented by using the presentation means appropriate for the environment, and thus the sound source can easily recognize the target movement information.

Also, the sensor may further include an image sensor that generates image data, and the processor may acquire the positional relationship by using the image data.

With this configuration, it is possible to acquire a highly accurate positional relationship by using the image data.

Also, the sensor may further include a distance measuring sensor that generates distance measurement data, and the processor may acquire the positional relationship by using the distance measurement data.

With this configuration, it is possible to acquire a highly accurate positional relationship by using the distance measurement data.

Also, the positional relationship may be at least one of a distance between the unmanned aerial vehicle and the sound source and a position of the sound source relative to the unmanned aerial vehicle.

Also, an information processing method according to an aspect of the present disclosure is an information processing method that is performed by a processor included in an unmanned aerial vehicle that includes: a sensor including at least a microphone that generates sound data; and the processor, the information processing method including: determining a quality of a target sound by using the sound data generated by the microphone; acquiring a positional relationship between the unmanned aerial vehicle and a sound source of the target sound by using data generated by the sensor; determining a destination to which the sound source is to move based on the quality of the target sound and the positional relationship; and presenting target movement information that prompts the sound source to move toward the destination.

With this configuration, it is possible to provide an information processing method, with which the quality of collected sound can be improved while ensuring the safety of the sound source.

Also, a recording medium according to an aspect of the present disclosure is a non-transitory computer-readable recording medium having a program recorded thereon for causing the above-described processor to execute the information processing method described above.

With this configuration, it is possible to provide a recording medium, with which the quality of collected sound can be improved while ensuring the safety of the sound source.

Generic or specific aspects of the present disclosure may be implemented by a system, a method, an integrated circuit, a computer program or a computer readable recording medium such as a CD-ROM, or may be implemented by any combination of a system, a method, an integrated circuit, a computer program and a recording medium.

Hereinafter, an unmanned aerial vehicle according to an aspect of the present invention will be described specifically with reference to the drawings.

The embodiment described below shows a generic or specific example of the present disclosure. The numerical values, shapes, materials, structural elements, the arrangement and connection of the structural elements, steps, the order of the steps, and the like shown in the following embodiment are merely examples, and therefore are not intended to limit the scope of the present disclosure. Also, among the structural elements described in the following embodiment, structural elements not recited in any one of the independent claims are described as arbitrary structural elements.

Embodiment

Hereinafter, an embodiment will be described with reference to FIGS. 1 to 22B.

[1. Configuration]

FIG. 1 is a block diagram showing an example of a configuration of unmanned aerial vehicle 100 according to an embodiment.

As shown in FIG. 1, unmanned aerial vehicle 100 includes processor 101, light emitter 106a, speaker 106b, communication IF 109, generator 110, sensor 120, and memory 130. In FIG. 1, only one generator 110 is shown, but unmanned aerial vehicle 100 may include, for example, two or more generators 110.

Unmanned aerial vehicle 100 is also referred to as "drone" or "unmanned aircraft". Unmanned aerial vehicle 100 is used as, for example, a communication tool. Unmanned aerial vehicle 100 may be capable of, for example, collecting a voice emitted by a human or the like, and may be capable of capturing images of a human or the like. Unmanned aerial vehicle 100 receives an operation signal corresponding to a user operation from a controller (for example, a proportional controller, or the like), and flies in accordance with the received operation signal. Also, unmanned aerial vehicle 100 may capture images by using image sensor 107 that is included in unmanned aerial vehicle 100 in accordance with the received operation signal while unmanned aerial vehicle 100 is flying. The image data generated by image sensor 107 may be transmitted to a presentation device, such as a portable terminal, which will be described later, provided external to unmanned aerial vehicle 100.

Generator 110 generates a force that causes unmanned aerial vehicle 100 to fly. Specifically, generator 110 generates an air flow so as to generate a force that causes unmanned aerial vehicle 100 to fly. Generator 110 includes rotor 111 that rotates to generate an air flow and actuator 112 that causes rotor 111 to rotate. Rotor 111 and actuator 112 have an axis of rotation that is substantially parallel to the vertical direction when unmanned aerial vehicle 100 is placed on the horizontal plane, and generate an air flow that flows from above to below. As a result, generator 110 generates a thrust that levitates unmanned aerial vehicle 100 upward and generates a force that causes unmanned aerial vehicle 100 to fly. Actuator 112 may be, for example, a motor.

Processor 101 is an electric circuit that performs information processing for controlling unmanned aerial vehicle 100, and may be, for example, a microprocessor, or the like. Processor 101 acquires the results of detection performed by acceleration sensor 103, gyro sensor 104, microphone 105, image sensor 107, distance measuring sensor 108, the results received by GPS (Global Positioning System) receiver 102 and communication IF 109, and the like, and performs various types of processing operations on the results of detection or the received results that have been acquired by executing a predetermined program stored in memory 130 such as a ROM or a RAM. By doing so, processor 101 controls at least one of generator 110, light emitter 106a, and speaker 106b. Also, memory 130 stores prohibited approach distance information, which will be described later. For the sake of simplifying the description, only one memory 130 is shown, but unmanned aerial vehicle 100 may include a plurality of memories. That is, for example, the memory in which the predetermined program is stored and the memory in which the prohibited approach distance information is stored do not necessarily need to be the same memory.

GPS receiver 102 receives information that indicates the position of GPS receiver 102 from an artificial satellite such as a GPS satellite. That is, GPS receiver 102 detects the current position of unmanned aerial vehicle 100. GPS receiver 102 sequentially outputs the detected current position of unmanned aerial vehicle 100 to processor 101 or memory 130.

Acceleration sensor 103 is a sensor that detects an acceleration in each of three different directions of unmanned aerial vehicle 100.

Gyro sensor 104 is a sensor that detects an angular velocity about each of three axes in three different directions of unmanned aerial vehicle 100.

Microphone 105 is, for example, a directive microphone that can collect sounds in a sound collection range that is a predetermined angular range relative to a specific direction at a quality higher than that of sounds collected outside the angular range of the sound collection range, and microphone 105 is included in sensor 120. The predetermined angular range is, for example, an angular range that is less than or equal to 90°, and is a three-dimensional angular range with a predetermined extent relative to the position of microphone 105. Microphone 105 may be a microphone array that includes a plurality of microphone elements. Microphone 105 sequentially generates sound data by collecting sounds, and sequentially outputs the sequentially generated sound data to processor 101 or memory 130. In the case where sound data is output to memory 130, memory 130 sequentially stores the output sound data. At this time, memory 130 may store the sound data in association with, for example, time information that indicates the current time.

Image sensor 107 constitutes a camera together with an optical system such as a lens, and image sensor 107 is included in sensor 120. Image sensor 107 sequentially generates image data by capturing images, and sequentially outputs the sequentially generated image data to processor 101 or memory 130. In the case where image data is output to memory 130, memory 130 sequentially stores the output image data. At this time, memory 130 may store the image data in association with, for example, time information that indicates the current time.

Distance measuring sensor 108 detects the distance from distance measuring sensor 108 to an object in the surroundings, and distance measuring sensor 108 is included in sensor 120. Distance measuring sensor 108 may be, for example, an ultrasonic sensor, a TOF (Time of Flight) camera, a LIDAR (Light Detection and Ranging), or the like. The distance measurement data generated by distance measuring sensor 108 may be data in which a direction based on distance measuring sensor 108 is associated with a distance to an object in the surroundings in that direction. Distance measuring sensor 108 is fixed to unmanned aerial vehicle 100 at a specified position. Accordingly, the positional relationship between the specified position and a reference position of unmanned aerial vehicle 100 such as the center of the main body of unmanned aerial vehicle 100 is a fixed relationship. Thus, by using the result of detection performed by distance measuring sensor 108, unmanned aerial vehicle 100 can calculate the positional relationship between the reference position of unmanned aerial vehicle 100 and the object in the surroundings. Distance measuring sensor 108 sequentially generates distance measurement data by measuring the distance, and sequentially outputs the generated distance measurement data to processor 101 or memory 130. In the case where distance measurement data is output to memory 130, memory 130 sequentially stores the output distance measurement data. At this time, memory 130 may sequentially store the distance measurement data in association with, for example, time information that indicates the current time. In unmanned aerial vehicle 100, a plurality of distance measuring sensors 108 may be attached to unmanned aerial vehicle 100 at a plurality of different positions. With this configuration, the plurality of distance measuring sensors 108 can detect the distance from unmanned aerial vehicle 100 to each of a plurality of objects in a plurality of directions.

Light emitter 106a may be, for example, an LED, and emits light by outputting light. Alternatively, for example, light emitter 106a may be a projector or the like that projects light onto the ground or the like, and an image, a character, or the like may be drawn on the ground using the projected light.

Speaker 106b outputs a sound.

Communication IF 109 is a communication interface for performing communication with a controller, a portable terminal, or the like. Communication IF 109 includes, for example, a communication interface for receiving a transmission signal output from a controller. Also, communication IF 109 may include a communication interface for performing wireless communication with a portable terminal, or in other words, communication IF 109 may include, for example, a wireless LAN (Local Area Network) interface that conforms to IEEE 802.11a, b, g, n, ac, and ax standards.

Processor 101 includes, as functional structural elements, sound collection processing unit 101a, quality determiner 101b, positional relationship acquirer 101c, destination determiner 101d, flight control unit 101e, and movement guiding unit 101f. The processing units described above sequentially perform processing operations by using the detection data sequentially detected by sensor 120, the results of processing sequentially performed by other processing units, and the like, and sequentially output the obtained results of processing to a predetermined output destination.

Sound collection processing unit 101a acquires the sound data generated as a result of microphone 105 collecting sounds, and performs predetermined sound processing on the acquired sound data. Sound collection processing unit 101a includes noise processing unit 101aa and noise level calculator 101ab. Noise processing unit 101aa performs sound source separation processing on the acquired sound data so as to separate the flight noise of unmanned aerial vehicle 100 and the target sound from each other. As used herein, the flight noise of unmanned aerial vehicle 100 (hereinafter, referred to simply as "noise") refers to, for example, noise generated as a result of generator 110 of unmanned aerial vehicle 100 being driven. Noise processing unit 101aa extracts the noise or the target sound by applying, for example, a directivity filter for obtaining directivity in an arbitrary direction to the sound signal obtained from the microphone element of microphone 105. By doing so, the noise and the target sound are separated from each other. Next, noise level calculator 101ab calculates the sound pressure level of the noise separated by noise processing unit 101aa and the sound pressure level of the target sound separated by noise processing unit 101aa. As a result, in sound collection processing unit 101a, from the sound data generated as a result of microphone 105 collecting sounds, the noise and the target sound contained in the sound data are extracted. Noise level calculator 101ab may reduce the noise contained in the sound data by performing predetermined sound processing of filtering a sound component in a predetermined frequency band. The sound component in the predetermined frequency band may be, for example, a frequency band of noise generated as a result of rotor 111 of generator 110 rotating.

Quality determiner 101b determines the quality of the target sound by using the sound data generated by microphone 105. Quality determiner 101b determines the quality of the target sound by using the sound pressure level of the noise and the sound pressure level of the target sound obtained by sound collection processing unit 101a. Specifically, quality determiner 101b determines whether the quality of the target sound is higher or lower than a predetermined targeted quality level. More specifically, quality determiner 101b calculates the SN ratio that is the ratio of the target sound relative to the noise by using the sound pressure level of the noise and the sound pressure level of the target sound, as an index for determining the quality of the target sound. Then, quality determiner 101b acquires, as the predetermined targeted quality level, a target SN ratio calculated by using the SN ratio obtained through calculation by using the target sound and the noise, compares the acquired target SN ratio with the calculated SN ratio, and determines the quality of the target sound. Here, the target SN ratio may be in a range of the SN ratio relative to the reference SN ratio. For example, the target SN ratio may be in a range of ±1 dB relative to the reference SN ratio. The target SN ratio may be stored in advance in memory 130 or in an external device. That is, quality determiner 101b may acquire the target SN ratio by reading the target SN ratio from memory 130 or may acquire the target SN ratio from the external device via communication IF 109.

Quality determiner 101b determines whether the SN ratio is higher or lower than the target SN ratio. If the SN ratio is higher than the target SN ratio, or in other words, if the SN ratio is higher than the upper limit of the range of the target SN ratio, quality determiner 101b determines that the quality is high. If the SN ratio is lower than the target SN ratio, or in other words, if the SN ratio is lower than the lower limit of the range of the target SN ratio, quality determiner 101b determines that the quality is low.

Positional relationship acquirer 101c acquires, by using the data generated by sensor 120, a positional relationship between unmanned aerial vehicle 100 and a target sound source (hereinafter, referred to simply as "sound source") that outputs the target sound. Specifically, positional relationship acquirer 101c acquires the positional relationship by using at least one of the sound data output by microphone 105, the image data output by image sensor 107, and the distance measurement data output by distance measuring sensor 108. The positional relationship is at least either one of the distance between unmanned aerial vehicle 100 and the sound source or the position of the sound source relative to unmanned aerial vehicle 100. Positional relationship acquirer 101c outputs the acquired positional relationship to destination determiner 101d.

Positional relationship acquirer 101c acquires, in the case of acquiring the positional relationship by using the sound data generated by microphone 105 (for example, a microphone array), at least one of the position of the sound source relative to unmanned aerial vehicle 100 and the distance to the sound source relative to unmanned aerial vehicle 100, as the positional relationship, by using the sound data. The position of the sound source relative to unmanned aerial vehicle 100 refers to a relative position of the sound source with respect to unmanned aerial vehicle 100. The distance to the sound source relative to unmanned aerial vehicle 100 refers to a distance from unmanned aerial vehicle 100 to the sound source.

Also, positional relationship acquirer 101c acquires, in the case of acquiring the positional relationship by using the image data generated by image sensor 107, at least one of the position of the sound source relative to unmanned aerial vehicle 100 and the distance to the sound source relative to unmanned aerial vehicle 100, by using the image data. For example, positional relationship acquirer 101c may acquire at least one of the position of the sound source, the distance to the sound source, and the direction of the sound source by recognizing the color, shape, type, and the like of the predetermined sound source through image processing performed on the image data.

Also, positional relationship acquirer 101c acquires, in the case of acquiring the positional relationship by using the distance measurement data generated by distance measuring sensor 108, at least one of the position of the sound source relative to unmanned aerial vehicle 100 and the distance to the sound source relative to unmanned aerial vehicle 100, by using the distance measurement data. For example, positional relationship acquirer 101c may acquire at least one of the position of the sound source, the distance to the sound source, and the direction of the sound source by constructing a three-dimensional model by using the distance measurement data, and recognizing the three-dimensional shape of the sound source from the constructed three-dimension model.

The sound source may be, for example, a human, a speaker that can be moved by a human, or a vehicle that can be moved by a human.

Destination determiner 101d determines a destination to which the sound source is to move based on the quality of the target sound determined by quality determiner 101b and the positional relationship acquired by positional relationship acquirer 101c. Specifically, destination determiner 101d determines a destination that is spaced apart from unmanned aerial vehicle 100 by a predetermined distance (a prohibited approach distance, which will be described later) based on the quality of the target sound, the positional relationship, and distance information (prohibited approach distance information, which will be described later). The destination may be, for example, a region that has a predetermined area, or may be a specific position (point). The destination includes a position or a region where the quality of the target sound after the sound source has moved to the destination reaches a targeted quality level that is predetermined or a level higher than the targeted quality level. Specifically, the destination includes a position or a region where the quality of the target sound after the sound source has moved to the destination reaches a targeted quality level that is predetermined or a level higher than the targeted quality level, the position or the region being spaced apart from unmanned aerial vehicle 100 by a predetermined distance.

Movement guiding unit 101f presents target movement information that prompts the sound source to move to the destination. Movement guiding unit 101f presents the target movement information by using light emitter 106a, speaker 106b, or an external presentation device that performs communication with unmanned aerial vehicle 100 via communication IF 109. The target movement information is implemented by using light output from light emitter 106a, a sound output from speaker 106b, or a character, an image, or the like displayed on a display panel included in the external presentation device. Unmanned aerial vehicle 100 may include a display panel or the like, and the target movement information may be implemented by using a character, an image, or the like displayed on the display panel. For example, the target movement information informs that the sound source should approach unmanned aerial vehicle 100, and prompts the sound source to move to the destination. For example, the target movement information includes information that indicates a position or a region where the quality of the target sound after the sound source has moved to the destination reaches a targeted quality level that is predetermined or a level higher than the targeted quality level, or information for guiding the sound source to the destination. Also, for example, the target movement information may inform that the sound source should move away from unmanned aerial vehicle 100.

Flight control unit 101e controls the flight status of unmanned aerial vehicle 100 by acquiring the result of detection performed by GPS receiver 102 to detect the current position of unmanned aerial vehicle 100, and controlling the rotation speed of actuator 112 of generator 110 according to the current position of unmanned aerial vehicle 100, the flight speed and the flight orientation of unmanned aerial vehicle 100 obtained from the results of detection performed by acceleration sensor 103 and gyro sensor 104, and the operation signal from the controller received via communication IF 109. That is, flight control unit 101e performs control to control the flight status of unmanned aerial vehicle 100 according to the user operation input to the controller.

[2. Operation]

Next, the operations of unmanned aerial vehicle 100 according to the embodiment will be described.

Figure 2:
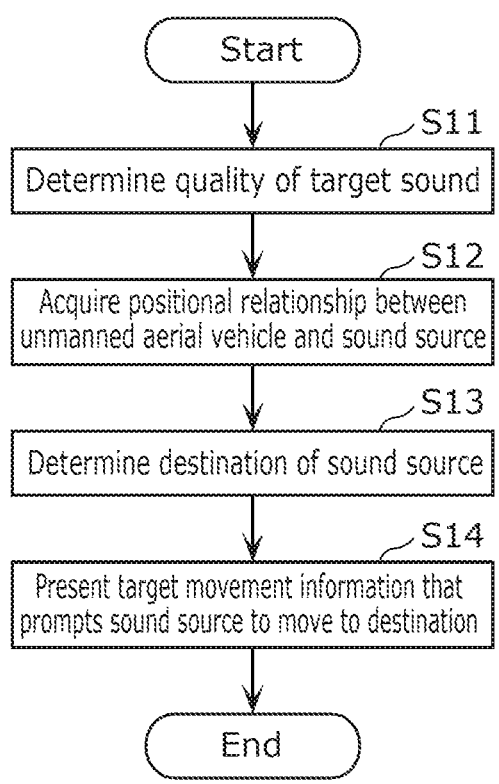
FIG. 2 is a flowchart illustrating an example of operations of the unmanned aerial vehicle according to the embodiment.

FIG. 2 is a flowchart illustrating an example of the operations of unmanned aerial vehicle 100 according to the embodiment. Hereinafter, the operations of the functional structural elements of processor 101 will be described as the operations of processor 101.

As described above, processor 101 determines the quality of the target sound by using the sound data generated by microphone 105 (step S11), acquires the positional relationship between unmanned aerial vehicle 100 and the sound source by using the data generated by sensor 120 (step S12), determines a destination to which the sound source is to move based on the quality of the target sound and the positional relationship (step S13), and presents target movement information that prompts the sound source to move to the destination (step S14).

Hereinafter, a specific example of the operations of unmanned aerial vehicle 100 (processor 101) will be described.

Figure 3:
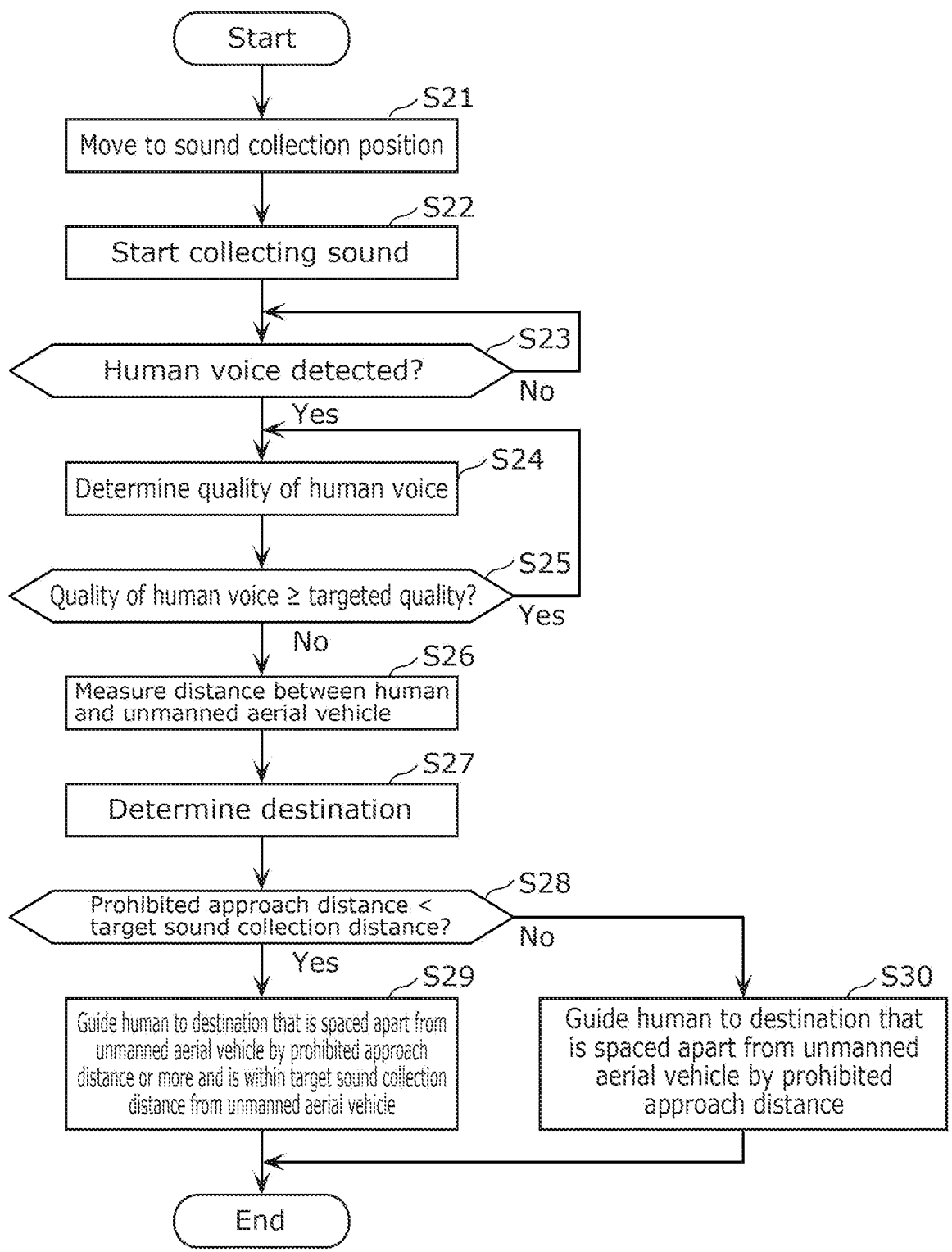
FIG. 3 is a flowchart illustrating a specific example of operations of the unmanned aerial vehicle according to the embodiment.

FIG. 3 is a flowchart illustrating a specific example of the operations of unmanned aerial vehicle 100 according to the embodiment. The following description will be given on the assumption that the sound source is human 200, and the target sound is the voice of human 200.

First, processor 101 causes unmanned aerial vehicle 100 to move to a predetermined sound collection position so as to collect the voice of human 200 (step S21). The sound collection position is, for example, a position that is spaced apart from human 200 by a predetermined distance (for example, 5 m to 10 m, or the like) and at which the voice of human 200 can be collected. The predetermined distance is determined according to, for example, the sensitivity of microphone 105, or the like. Also, it is sufficient that the voice of human 200 collected at the sound collection position is a voice that can be distinguished from noise, and it does not necessarily need to be at a voice level at which the words spoken by the voice can be recognized. That is, it is sufficient that it is possible to recognize that the voice of human 200 is collected at the sound collection position.

Next, processor 101 starts collecting sounds at the sound collection position (step S22). Processor 101 may start collecting sounds before unmanned aerial vehicle 100 arrives at the sound collection position. For example, unmanned aerial vehicle 100 may collect sounds while flying.

Next, processor 101 determines whether or not the voice of human 200 has been detected (step S23). As described above, processor 101 may not be able to recognize the words spoken by the voice of human 200, and determines whether or not the voice of human 200 has been collected. For example, processor 101 may distinguish and detect the voice of specific human 200. In this case, processor 101 may have a sound recognition function.

If it is determined that the voice of human 200 has not been detected (No in step S23), for example, at the sound collection position, processor 101 waits for detection of the voice of human 200. There may be a case where, despite the fact that human 200 is speaking, processor 101 cannot detect the voice of human 200 because the loudness of the voice is too small. To address such a case, for example, if the voice of human 200 cannot be detected after a predetermined time has passed, processor 101 may present voice volume change information that prompts human 200 to change the voice volume. For example, processor 101 may cause speaker 106b to output a sound that prompts human 200 to speak loudly, or may cause light emitter 106a to project, onto the ground, light that indicates a character or the like that prompts human 200 to speak loudly, or may cause an external presentation device to provide a display that prompts human 200 to speak loudly.

If it is determined that the voice of human 200 has been detected (Yes in step S23), processor 101 determines the quality of the voice of human 200 (step S24).

Specifically, processor 101 determines whether or not the quality of the voice of human 200 is higher than or equal to the targeted quality level (step S25). Processor 101 does not necessarily need to determine whether or not the quality of the voice of human 200 at a certain moment is a targeted quality level or a level higher than the targeted quality level. For example, processor 101 may determine whether or not the average quality of the voice of human 200 during a period from when human 200 starts speaking to when human 200 finishes speaking is a targeted quality level or a level higher than the targeted quality level. This is because the sound pressure level of human voice fluctuates, and thus even when the quality of the voice of human 200 at a certain moment is lower than the targeted quality level, it does not always mean that the quality of the voice of human 200 is constantly low. Also, even in the case where the quality of the voice of human 200 at a certain moment reaches a level lower than the targeted quality level, if the quality of the voice of human 200 in a period other than that moment is higher than the targeted quality level, the contents spoken by human 200 at the certain moment can be complemented based on the voice of human 200 in the period other than the certain moment.

If it is determined that the quality of the voice of human 200 is a targeted quality level or a level higher than the targeted quality level (Yes in step S25), processor 101 continues sound collection so as to be ready for when the quality of human voice reaches a level lower than the targeted quality level, and repeats the processing in steps S24 and S25.

If it is determined that the quality of the voice of human 200 is lower than the targeted quality level (No in step S25), processor 101 measures the distance between human 200 and unmanned aerial vehicle 100 (step S26), and determines a destination to which human 200 is to move (step S27). Here, a method for determining the destination will be described with reference to FIG. 4.

Figure 4:
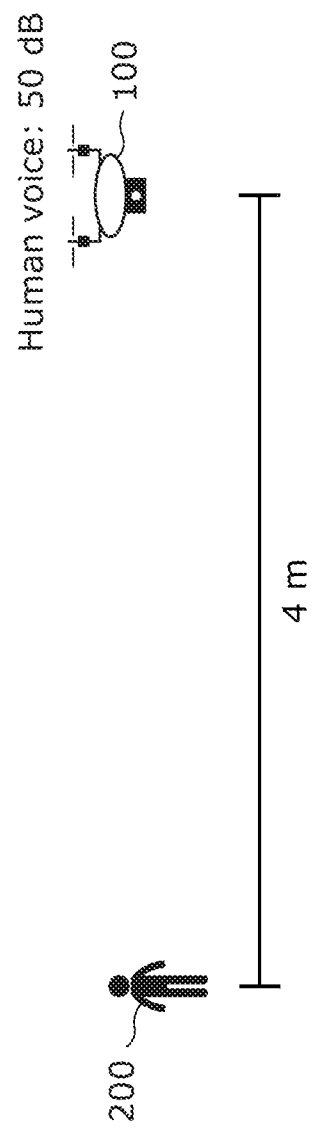
FIG. 4 is a diagram illustrating a method for determining a destination.

FIG. 4 is a diagram illustrating the method for determining the destination.

As shown in FIG. 4, for example, it is assumed that the sound pressure level of the voice of human 200 at the sound collection position is calculated to be 50 dB. It is also assumed that, for example, the noise (for example, the flight noise of unmanned aerial vehicle 100) has a sound pressure level of 70 dB, and the target SN ratio relative to the noise is −14 dB. In this case, the sound pressure level required to collect the voice of human 200 as the targeted quality level is 56 dB. For this reason, in this case, it is determined that the quality of the voice of human 200 is lower than the targeted quality level. Then, as shown in FIG. 4, the distance between human 200 and unmanned aerial vehicle 100 is measured to be 4 m.

Processor 101 determines, as the destination, a position or a region where the quality of the voice of human 200 reaches a targeted quality level or a level higher than the targeted quality level. That is, processor 101 determines the destination where the quality of the voice of human 200 reaches a targeted quality level or a level higher than the targeted quality level when human 200 emits his/her voice at the destination. For example, processor 101 determines the destination by utilizing the sound attenuation characteristics in which the sound pressure level attenuates by 6 dB when the distance is doubled. That is, calculation is performed to obtain the distance human 200 needs to move to approach unmanned aerial vehicle 100, for the sound pressure level of the voice of human 200 to reach 56 dB at the position of unmanned aerial vehicle 100. Specifically, the distance between human 200 and unmanned aerial vehicle 100 when human 200 has moved to the destination can be calculated by using Equation 1 given below. In Equation 1, the measured distance between human 200 and unmanned aerial vehicle 100 is represented by d, the sound pressure level of the voice of human 200 collected by unmanned aerial vehicle 100 at the sound collection position is represented by s, the target sound pressure level (targeted quality) is represented by Ts, the distance between human 200 and unmanned aerial vehicle 100 when the quality of the voice of human 200 reaches the targeted quality level (hereinafter, also referred to as "target sound collection distance") is represented by Td.

[Math. 1]

$$Td = d \times 2^{\left(-\frac{Ts-s}{6}\right)} \quad \text{(Equation 1)}$$

When calculation is performed by using d=4, s=50, and Ts=56, Td=2 is obtained as a result of the calculation. That is, a position or a region that is within a target sound collection distance of 2 m from unmanned aerial vehicle 100 is determined as the destination.

The destination is calculated based on the sound pressure level of the voice of human 200 acquired at the position of unmanned aerial vehicle 100, but the calculation method is not limited thereto. For example, the destination may be calculated from the sound pressure level of the voice of human 200 at the position of human 200 and the sound attenuation characteristics by estimating the sound pressure level of the voice emitted by human 200 at the position of human 200.

As described above, processor 101 determines the destination to which human 200 is to move based on the quality of the voice of human 200 and the positional relationship between human 200 and unmanned aerial vehicle 100. Processor 101 may further acquire distance information that indicates a predetermined distance from unmanned aerial vehicle 100, and determine, based on the distance information and the quality of the voice of human 200, target movement information so as to prevent human 200 from moving closer to unmanned aerial vehicle 100 beyond the predetermined distance from unmanned aerial vehicle 100. Then, processor 101 may determine the destination that is spaced apart from unmanned aerial vehicle 100 by the predetermined distance based on the quality of the voice of human 200, the positional relationship, and the distance information. As used herein, the predetermined distance refers to a distance beyond which human 200 is prohibited to move closer to unmanned aerial vehicle 100, or in other words, a distance in which safety of human 200 cannot be ensured if unmanned aerial vehicle 100 goes out of control, and it may be, for example, a distance prescribed by law regulations, or the like. Hereinafter, the predetermined distance may also be referred to as "prohibited approach distance", and the distance information that indicates the predetermined distance (or in other words, the prohibited approach distance) may also be referred to as "prohibited approach distance information".

Referring back to FIG. 3, processor 101 determines whether or not the target sound collection distance is greater than the prohibited approach distance (step S28).

If the target sound collection distance is greater than the prohibited approach distance (Yes in step S28), processor 101 guides human 200 to a destination that is spaced apart from unmanned aerial vehicle 100 by the prohibited approach distance or more and is within the target sound collection distance from unmanned aerial vehicle 100 (step S29). The destination in this case will be described with reference to FIG. 5A.

Figure 5A:
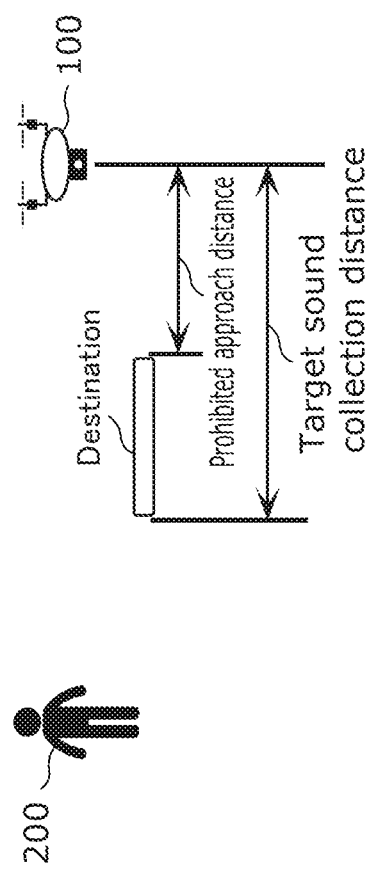
FIG. 5A is a diagram showing an example of a destination.

FIG. 5A is a diagram showing an example of the destination. If the target sound collection distance is greater than the prohibited approach distance, the destination is set to a position or a region that is spaced apart from unmanned aerial vehicle 100 by the prohibited approach distance or more and is within the target sound collection distance from unmanned aerial vehicle 100. In FIG. 5A, the destination is shown as a region, but the destination may be an arbitrary position (point) in the region.

If it is determined that the target sound collection distance is less than or equal to the prohibited approach distance (No in step S28), processor 101 guides human 200 to a destination that is spaced apart from unmanned aerial vehicle 100 by the prohibited approach distance (step S30). The destination in this case will be described with reference to FIG. 5B.

Figure 5B:
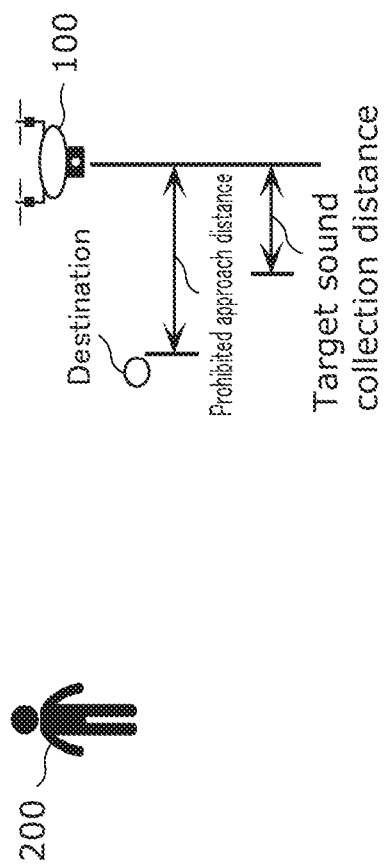
FIG. 5B is a diagram showing another example of a destination.

FIG. 5B is a diagram showing another example of the destination. If it is determined that the target sound collection distance is less than or equal to the prohibited approach distance, the destination is set to a position that is spaced apart from unmanned aerial vehicle 100 by the prohibited approach distance. In this case, even if human 200 moves to the destination, human 200 is not at a position within the target sound collection distance from unmanned aerial vehicle 100, and it is therefore expected that the quality of the voice of human 200 does not reach a targeted quality level or a level higher than the targeted quality level. In this case, priority is given to the safety of human 200 by preventing human 200 from entering the prohibited approach distance from unmanned aerial vehicle 100 while increasing the quality of the voice of human 200 as much as possible.

Processor 101 guides human 200 to the destination by presenting the target movement information that prompts human 200 to move to the destination. The guiding method will be described later.

If the quality of the voice of human 200 is lower than the targeted quality level even after the processing in steps S25 to S30 ends, processor 101 presents the target movement information that informs that human 200 should approach unmanned aerial vehicle 100. By doing so, because human 200 is prompted to move toward the destination to approach unmanned aerial vehicle 100 when the quality of the voice of human 200 is lower than the targeted quality level, the quality of collected sound can be improved. As used herein, the quality of collected sound refers to, for example, sound pressure level, SN ratio, or recognition rate for recognizing a sound.

Also, a position or a region that is spaced apart from unmanned aerial vehicle 100 by at least the prohibited approach distance is determined as the destination, and it is therefore possible to prompt human 200 to not approach unmanned aerial vehicle 100 beyond the prohibited approach distance, as a result of which, the safety of human 200 can be ensured.

As described above, according to the present disclosure, it is possible to suppress a situation where human 200 is too close to unmanned aerial vehicle 100 and exposed to danger, or a situation where human 200 is not so close to unmanned aerial vehicle 100 and the quality of collected sound decreases. Accordingly, the quality of collected sound can be improved while ensuring safety of human 200.

[3. Guiding Method]

Next, a method for guiding human 200 to the destination will be described. Examples of the method for guiding human 200 to the destination include a method in which light emitter 106a is caused to present the target movement information, a method in which speaker 106b is caused to present the target movement information, and a method in which an external presentation device is caused to present the target movement information. In the case where unmanned aerial vehicle 100 includes a display panel or the like, the target movement information may be displayed on the display panel. Hereinafter, various variations of the guiding method will be described with reference to FIGS. 6 to 12B.

The target movement information includes, for example, information that indicates a position or a region where the quality of the voice of human 200 reaches a targeted quality level or a level higher than the targeted quality level when human 200 has moved to the destination. Specifically, the position or the region is a position or a region located between the distance over which human 200 is prohibited to approach unmanned aerial vehicle 100 and the distance at which the quality of the voice of human 200 reaches a targeted quality level or a level higher than the targeted quality level. This will be described with reference to FIGS. 6 to 8.

Figure 6:
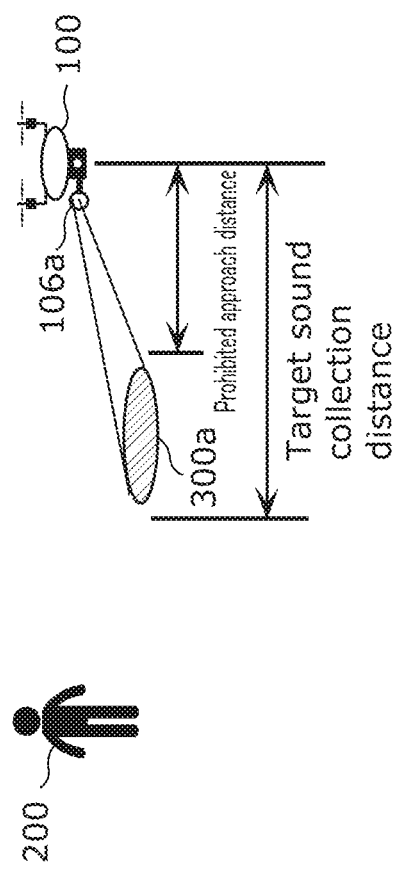
FIG. 6 is a diagram showing an example of information that is presented as target movement information and indicates a region in which the quality of the target sound is a targeted quality level or a level higher than the targeted quality level and the safety of the sound source is ensured.

FIG. 6 is a diagram showing an example of information that is presented as the target movement information and that indicates a region where the quality of the target sound (the voice of human 200) reaches a targeted quality level or a level higher than the targeted quality level and where safety of the sound source (human 200) is ensured.

As shown in FIG. 6, target movement information 300a may be light (or may be a character, an image, or the like expressed by light) that is projected by light emitter 106a onto the ground in a region or the like that corresponds to the destination where the quality of the voice of human 200 reaches a targeted quality level or a level higher than the targeted quality level and safety of human 200 is ensured. That is, processor 101 presents target movement information 300a to human 200 by causing light emitter 106a to project light onto the ground in a region that is spaced apart from unmanned aerial vehicle 100 by the prohibited approach distance or more and within the target sound collection distance from unmanned aerial vehicle 100. Human 200 can recognize that human 200 should move to the region indicated by the projected light as the destination by viewing target movement information 300a that is presented.

Figure 7:
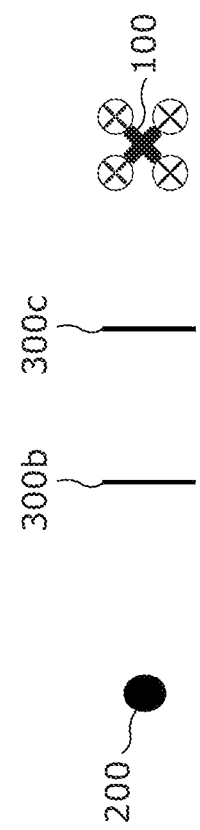
FIG. 7 is a diagram showing an example of information that is presented as target movement information and indicates the boundaries of a region in which the quality of the target sound is a targeted quality level or a level higher than the targeted quality level and the safety of the sound source is ensured.

FIG. 7 is a diagram showing an example of information that is presented as the target movement information and that indicates the positions of the boundaries of the region where the quality of the target sound (the voice of human 200) reaches a targeted quality level or a level higher than the targeted quality level and safety of the sound source (human 200) is ensured. FIGS. 7 to 10 are diagrams showing human 200 and unmanned aerial vehicle 100 as viewed from above.

As shown in FIG. 7, target movement information 300b and target movement information 300c are, for example, linear light beams projected by light emitter 106a onto the ground at the positions of the boundaries of the region that corresponds to the destination where the quality of the voice of human 200 reaches a targeted quality level or a level higher than the targeted quality level and safety of human 200 is ensured. For example, target movement information 300b is light projected onto a position spaced apart from unmanned aerial vehicle 100 by the target sound collection distance (the position will also be referred to as the position of the target sound collection distance), and target movement information 300c is light projected onto a position spaced apart from unmanned aerial vehicle 100 by the prohibited approach distance (the position will also be referred to as the position of the prohibited approach distance). That is, processor 101 presents target movement information 300b and target movement information 300c to human 200 by causing light emitter 106a to project light beams to the position of the prohibited approach distance and the position of the target sound collection distance.

Human 200 can recognize, by viewing target movement information 300b presented, that human 200 should move beyond the position (line) to which light is projected as the destination and approach unmanned aerial vehicle 100. Also human 200 can recognize, by viewing target movement information 300c presented, that human 200 should not move toward unmanned aerial vehicle 100 beyond the position (line) to which light is projected.

Target movement information 300b and target movement information 300c may be configured differently such that human 200 can distinguish the target sound collection distance and the prohibited approach distance from each other. For example, target movement information 300b and target movement information 300c may be configured to have different colors of projected light or different line widths. In the case where light emitter 106a cannot simultaneously present target movement information 300b and target movement information 300c, light emitter 106a may present target information 300b and target movement movement information 300c alternatively, or may switch the presented target movement information according to a specific condition (which will be described later in detail with reference to FIGS. 15A to 15C).

FIG. 8 is a diagram showing another example of information that is presented as the target movement information and that indicates the boundaries of the region where the quality of the target sound (the voice of human 200) reaches a targeted quality level or a level higher than the targeted quality level and safety of the sound source (human 200) is ensured.

As shown in FIG. 8, target movement information 300d and target movement information 300e may be circular light beams projected by light emitter 106a onto the ground at the positions of the boundaries of the region that corresponds to the destination where the quality of the voice of human 200 reaches a targeted quality level or a level higher than the targeted quality level and safety of human 200 is ensured. For example, target movement information 300e is light projected on the circumference of a circle at a position spaced apart from unmanned aerial vehicle 100 by the target sound collection distance, and target movement information 300d is light projected on the circumference of a circle at a position spaced apart from unmanned aerial vehicle 100 by the prohibited approach distance. That is, processor 101 presents target movement information 300d and target movement information 300e to human 200 by causing light emitter 106a to project light on the circumference of a circle at a position spaced apart from unmanned aerial vehicle 100 by the prohibited approach distance and to project light on the circumference of a circle at a position spaced apart from unmanned aerial vehicle 100 by the target sound collection distance. Human 200 can recognize, by viewing target movement information 300e presented, that human 200 should move toward (inward of) unmanned aerial vehicle 100 beyond the circumference of the circle indicated by the projected light as the destination. Also, human 200 can recognize, by viewing target movement information 300d presented, that human 200 should not move toward (inward of) unmanned aerial vehicle 100 beyond the circumference of the circle indicated by the projected light.

As with target movement information 300b and target movement information 300c, target movement information 300d and target movement information 300e may be configured differently. Target movement information 300d and target movement information 300e may be presented alternatively, or the presented target movement information may be switched according to a specific condition. Also, target movement information 300d and target movement information 300e do not necessarily need to be presented at a full 360 degrees around unmanned aerial vehicle 100, and may be presented only in an area that corresponds to a direction in which human 200 is present relative to unmanned aerial vehicle 100. This is because even when the target movement information is presented in an area that corresponds to a direction in which human 200 is not present relative to unmanned aerial vehicle 100, it is unlikely that human 200 moves to the area that corresponds to the direction in which human 200 is not present.

As described above, in the case where the target movement information is configured to include information that indicates a position or a region where the quality of the voice of human 200 when human 200 has moved to the destination reaches a targeted quality level or a level higher than the targeted quality level, by presenting the position or the region where the quality of the voice of human 200 reaches a targeted quality level or a level higher than the targeted quality level, human 200 can intuitively move to the position or the region.

Also, because the position or the region described above is located between the distance over which human 200 is prohibited to approach unmanned aerial vehicle 100 and the distance at which the quality of the voice of human 200 reaches a predetermined targeted quality level or a level higher than the predetermined targeted quality level, human 200 can intuitively move to the position or the region where the quality of collected sound can be improved while ensuring safety.

Processor 101 may cause a presentation device provided external to unmanned aerial vehicle 100 to present the target movement information through communication. For example, processor 101 may cause the external presentation device to present an image obtained by superimposing lines or the like that indicate the position of the target sound collection distance and the position of the prohibited approach distance onto an image captured by image sensor 107 in a direction from unmanned aerial vehicle 100 toward human 200, the direction being obliquely downward to unmanned aerial vehicle 100. Also, for example, processor 101 may present such an image to a display panel or the like of unmanned aerial vehicle 100.

Also, the target movement information includes, for example, information for guiding human 200 to the destination. Specifically, the target movement information includes information that indicates a direction of movement from the current position of human 200 to the destination, information that indicates a moving route to the destination of human 200, or information that indicates whether or not human 200 has moved to the destination. This will be described with reference to FIGS. 9 to 12B.

First, an example will be described in which the target movement information includes the information that indicates a direction of movement from the current position of human 200 to the destination.

FIG. 9 is a diagram showing an example of information that is presented as the target movement information and indicates a direction of movement to the destination.

As shown in FIG. 9, target movement information 300f is light that indicates a direction of movement from the current position of human 200 to the destination and that is projected onto the ground between human 200 and unmanned aerial vehicle 100 by light emitter 106a (or it may be a character, an image, or the like expressed by light). Human 200 can recognize, by viewing target movement information 300f for guiding human 200 to the destination that is presented, that human 200 should move in a direction indicated by the projected light (arrow). In FIG. 9, target movement information 300b and target movement information 300c are presented, but they do not necessarily need to be presented together. However, by presenting target movement information 300b and target movement information 300c together, it is possible to easily guide human 200 to the destination because human 200 can easily recognize how close human 200 can finally move toward unmanned aerial vehicle 100 and the boundary beyond which human 200 should not move.

Next, an example will be described in which the target movement information includes the information that indicates a moving route to the destination of human 200.

FIG. 10 is a diagram showing an example of information that is presented as the target movement information and indicates a moving route to the destination.

As shown in FIG. 10, target movement information 300g is light that indicates a moving route to the destination of human 200 and is projected by light emitter 106a (or it may be a character, an image, or the like expressed by light) onto the ground between human 200 and unmanned aerial vehicle 100. Human 200 can recognize, by viewing target movement information 300g for guiding human 200 to the destination that is presented, that human 200 should move along the projected light. Target movement information 300g that indicates the moving route may be projected such that light flows from human 200 toward unmanned aerial vehicle 100. Also, in FIG. 10, target movement information 300b and target movement information 300c are presented, but they do not necessarily need to be presented together. However, by presenting target movement information 300b and target movement information 300c together, it is possible to easily guide human 200 to the destination because human 200 can easily recognize how close human 200 can finally move toward unmanned aerial vehicle 100 and the boundary beyond which human 200 should not move.

The positions of target movement information 300f and target movement information 300g that are projected are adjusted according to the position of human 200 such that target movement information 300f and target movement information 300g are projected in front of human 200 even when human 200 moves.

Next, an example will be described in which the target movement information includes the information that indicates whether or not human 200 has moved to the destination.

Figure 11A:
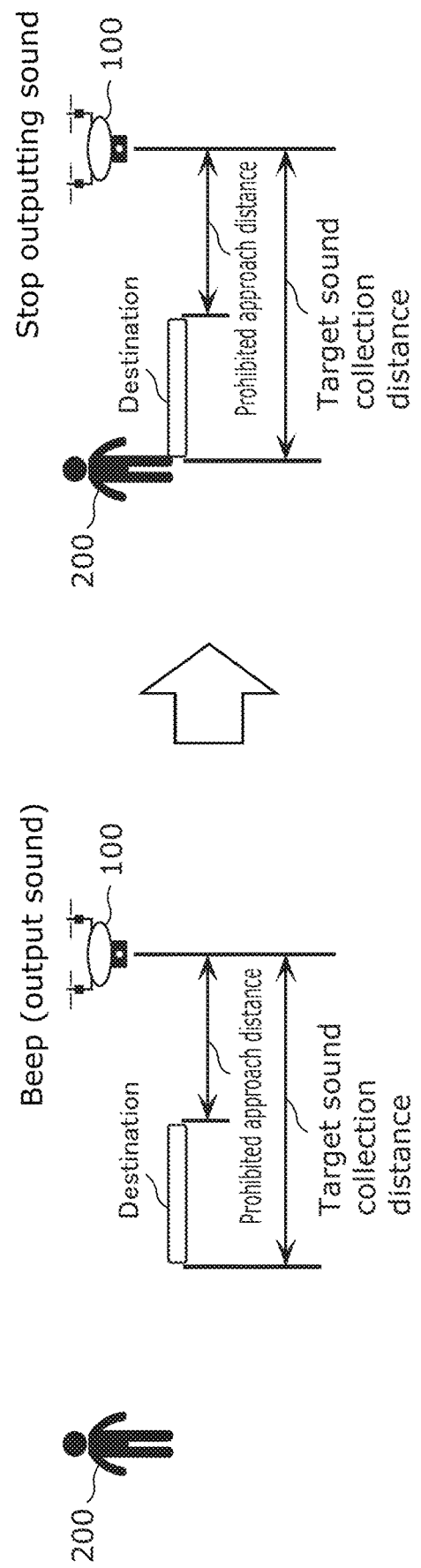
FIG. 11A is a diagram showing an example of information (sound) that is presented as target movement information and indicates whether or not a human has moved to the destination.

FIG. 11A is a diagram showing an example of information (sound) that is presented as the target movement information and indicates whether or not human 200 has moved to the destination.

The target movement information may be, for example, a sound output by speaker 106b. If it is determined that human 200 has not moved to the destination, a sound is output as shown on the left side of FIG. 11A. If it is determined that human 200 has moved to the destination, the output of the sound is stopped as shown on the right side of FIG. 11A. For example, in the case where there is a predetermined rule that human 200 should approach unmanned aerial vehicle 100 while a sound is output, when human 200 hears the target movement information (sound) for guiding human 200 to the destination that is presented, human 200 can recognize that human 200 has not arrived at the destination while the sound is output, and thus human 200 approaches unmanned aerial vehicle 100. Then, when the output of the sound is stopped, human 200 can recognize that human 200 has arrived at the destination. In the case where human 200 approaches unmanned aerial vehicle 100 beyond the prohibited approach distance, a sound with a tone or a pitch that is different from that of the sound output before human 200 arrives at the destination may be output. With this configuration, human 200 can recognize that human 200 is too close to unmanned aerial vehicle 100.

Figure 11B:
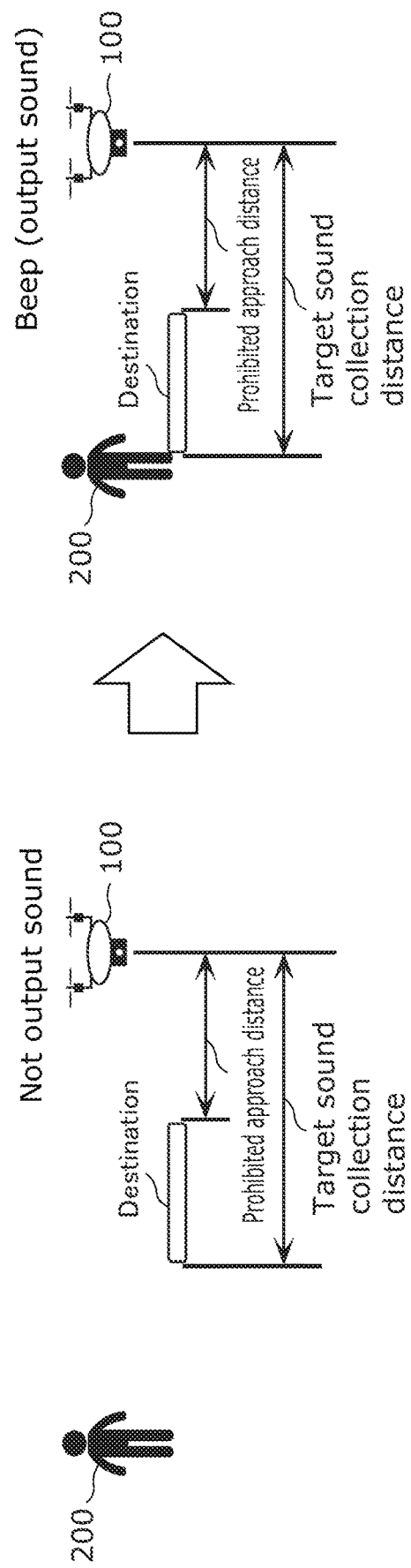
FIG. 11B is a diagram showing another example of information (sound) that is presented as the target movement information and indicates whether or not the human has moved to the destination.

FIG. 11B is a diagram showing another example of information (sound) that is presented as the target movement information and indicates whether or not human 200 has moved to the destination.

The target movement information may be, for example, a sound output by speaker 106b as in FIG. 11A. However, in this example, if it is determined that human 200 has not arrived at the destination, a sound is not output as shown in the left side of FIG. 11B. If it is determined that human 200 has arrived at the destination, a sound is output as shown on the right side of FIG. 11B. For example, in the case where there is a predetermined rule that human 200 should approach unmanned aerial vehicle 100 while a sound is not output, when the target movement information (sound) for guiding human 200 to the destination is output, human 200 can recognize that human 200 has arrived at the destination. In the case where human 200 approaches unmanned aerial vehicle 100 beyond the prohibited approach distance, a sound with a tone or a pitch that is different from that of the sound output before human 200 arrives at the destination may be output. With this configuration, human 200 can recognize that human 200 is too close to unmanned aerial vehicle 100.

In the examples shown in FIGS. 11A and 11B, whether or not human 200 has moved to the destination is determined based on the fact that a sound is not output. However, the determination does not necessarily need to be made based on the fact that a sound is not output. For example, different sounds may be output between when human 200 has not arrived at the destination, when human 200 has arrived at the destination, and when human 200 is too close to unmanned aerial vehicle 100.

Figure 12A:
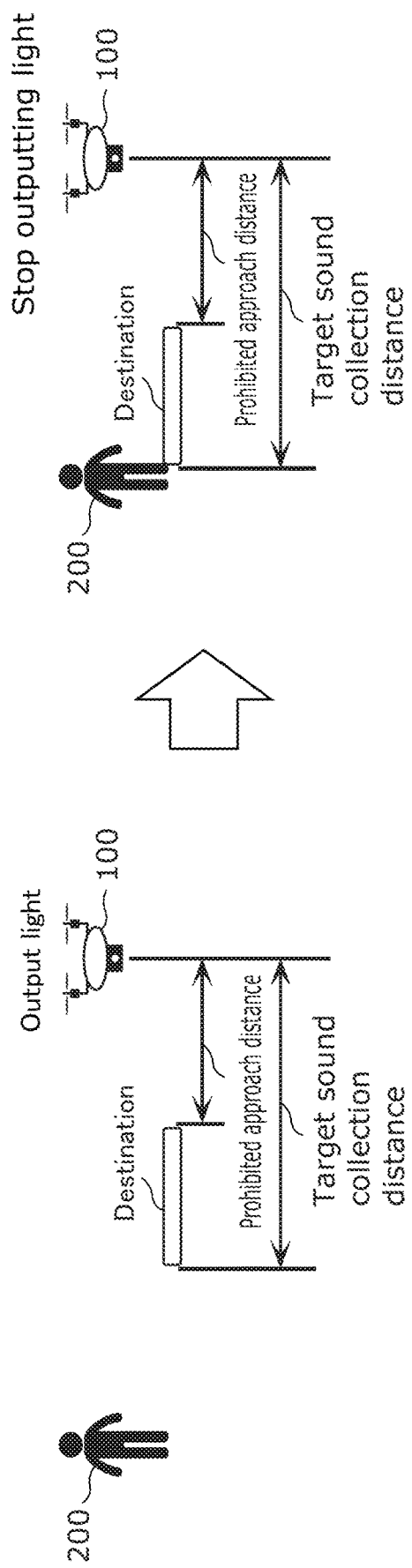
FIG. 12A is a diagram showing an example of information (light) that is presented as target movement information and indicates whether or not the human has moved to the destination.

FIG. 12A is a diagram showing an example of information (light) that is presented as the target movement information and indicates whether or not human 200 has moved to the destination.

The target movement information may be, for example, light output by light emitter 106a (for example, an LED or the like). If it is determined that human 200 has not arrived at the destination, light is output as shown on the left side of FIG. 12A. If it is determined that human 200 has moved to the destination, the output of the light is stopped as shown on the right side of FIG. 12A. For example, in the case where there is a predetermined rule that human 200 should approach unmanned aerial vehicle 100 while light is output, when human 200 sees the target movement information (light) for guiding human 200 to the destination that is presented, human 200 can recognize that human 200 has not arrived at the destination while the light is output, and thus human 200 approaches unmanned aerial vehicle 100. Then, when the output of the light is stopped, human 200 can recognize that human 200 has arrived at the destination. In the case where human 200 approaches unmanned aerial vehicle 100 beyond the prohibited approach distance, light of a different configuration that is different from that output before human 200 arrives at the destination may be output, such as light of a different color may be output, or light may be caused to blink in a different manner. With this configuration, human 200 can recognize that human 200 is too close to unmanned aerial vehicle 100.

Figure 12B:
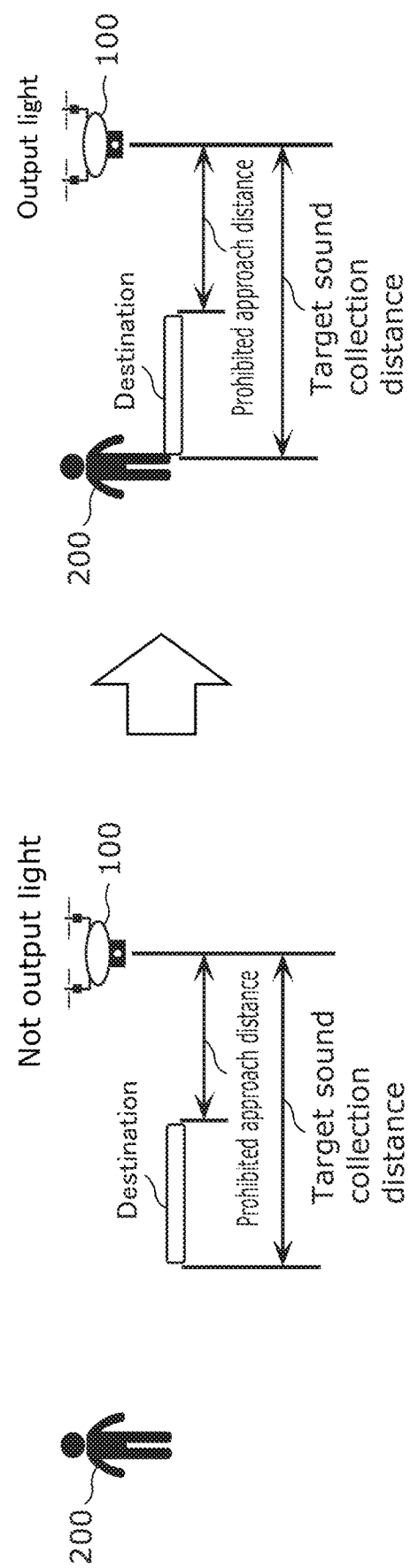
FIG. 12B is a diagram showing another example of information (light) that is presented as the target movement information and indicates whether or not the human has moved to the destination.

FIG. 12B is a diagram showing another example of information (light) that is presented as the target movement information and indicates whether or not human 200 has moved to the destination.

The target movement information may be, for example, light output by light emitter 106a as in FIG. 12A. However, in this example, if it is determined that human 200 has not arrived at the destination, light is not output as shown on the left side of FIG. 12B. If it is determined that human 200 has arrived at the destination, light is output as shown on the right side of FIG. 12B. For example, in the case where there is a predetermined rule that human 200 should approach unmanned aerial vehicle 100 while light is not output, when human 200 sees the target movement information (light) for guiding human 200 to the destination that is presented, with the light being output, human 200 can recognize that human 200 has arrived at the destination. In the case where human 200 approaches unmanned aerial vehicle 100 beyond the prohibited approach distance, light of a different configuration that is different from that output before human 200 arrives at the destination may be output, such as light of a different color may be output, or light may be caused to blink in a different manner. With this configuration, human 200 can recognize that human 200 is too close to unmanned aerial vehicle 100.

In the examples shown in FIGS. 12A and 12B, whether or not human 200 has moved to the destination is determined based on the fact that light is not output. However, the determination does not necessarily need to be made based on the fact that light is not output. For example, light beams of different configurations may be output between when human 200 has not arrived at the destination, when human 200 has arrived at the destination, and when human 200 is too close to unmanned aerial vehicle 100.

As described above, the target movement information includes information that guides human 200 to the destination, and thus human 200 can move to the destination without getting lost.

Specifically, the target movement information includes the information that indicates a direction of movement from the current position of human 200 to the destination, and thus human 200 is guided by the presented information that indicates the direction of movement, and therefore can move to the destination without getting lost. Also, specifically, the target movement information includes the information that indicates a moving route to the destination of human 200, and thus human 200 is guided by the presented information that indicates the moving route, and therefore can move to the destination without getting lost. Also, specifically, the target movement information includes the information that indicates that human 200 has moved to the destination, and thus human 200 is guided by the information that indicates that human 200 has moved to the destination, and therefore can recognize whether or not human 200 has moved to the destination.

Processor 101 may guide human 200 to the destination by outputting, from speaker 106b, a sound that informs human 200 of a specific distance to move or a specific number of steps that needs to be taken by human 200. For example, a sound saying "please move 50 cm in the direction of the unmanned aerial vehicle" or "please take three more steps toward the unmanned aerial vehicle" may be output. Also, processor 101 may recognize the height of human 200 by using image sensor 107 or the like, estimate a stride length from the recognized height of human 200, and calculate the number of steps that needs to be taken.

Also, processor 101 may cause an external presentation device to present a map or an image on which the destination is superimposed, an image or a sound that indicates a direction of movement, or an image or a sound that indicates a distance to the destination. Also, processor 101 may cause an external presentation device owned by human 200 to output a sound or light when human 200 has arrived at the destination, or may cause the external presentation device to vibrate.

As described above, processor 101 causes a presentation device external to unmanned aerial vehicle 100 to present the target movement information through communication, and thus human 200 can move toward the destination while checking the presentation device such as, for example, a portable terminal, owned by human 200.

The manner in which the target movement information is presented may be changed according to the position of human 200. The method for presenting the target movement information according to the position of human 200 will be described by way of first to eighth examples with reference to FIGS. 13A to 20. FIGS. 13A to 20 are diagrams showing human 200 and unmanned aerial vehicle 100 as viewed from above.

Figure 13A:
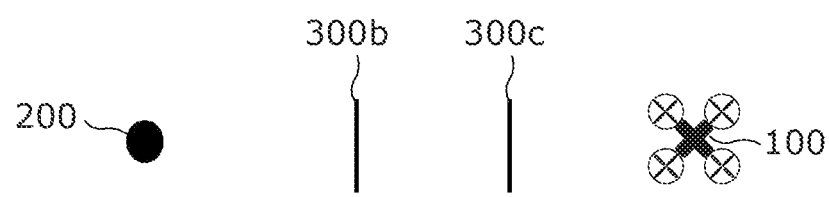
FIG. 13A is a diagram illustrating a first example of a method for presenting the target movement information according to the position of the human.
Figure 13B:
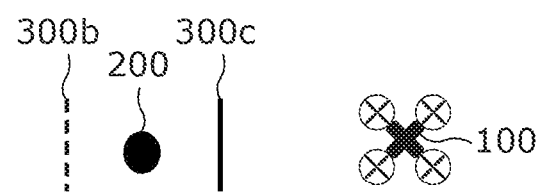
FIG. 13B is a diagram illustrating the first example of the method for presenting the target movement information according to the position of the human.
Figure 13C:
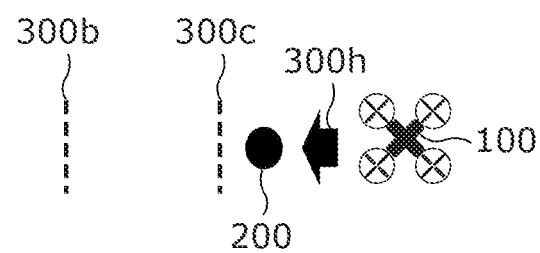
FIG. 13C is a diagram illustrating the first example of the method for presenting the target movement information according to the position of the human.

FIGS. 13A to 13C are diagrams illustrating a first example of the method for presenting the target movement information according to the position of human 200. In FIGS. 13A to 13C, target movement information 300b and target movement information 300c that are indicated by dotted lines mean that target movement information 300b and target movement information 300c are not displayed, and do not mean that target movement information 300b and target movement information 300c are displayed as dotted lines.

For example, in the case where light is projected onto the ground behind human 200 (on the opposite side of unmanned aerial vehicle 100 relative to human 200), human 200 cannot visually recognize the light projected behind human 200, and thus there is no meaning in projecting light behind human 200. Also, there may be a case where even when an attempt is made to project light behind human 200, it is not possible to project light behind human 200 because human 200 serves as an obstacle. Thus, depending on the position of human 200, the target movement information may not be presented behind human 200.

As shown in FIG. 13A, when there is a large distance between human 200 and unmanned aerial vehicle 100, the position of the target sound collection distance and the position of the prohibited approach distance are located between human 200 and unmanned aerial vehicle 100. Accordingly, target movement information 300b and target movement information 300c are presented in front of human 200.

As shown in FIG. 13B, when human 200 arrives at the destination located between the position of the target sound collection distance and the position of the prohibited approach distance, the position of the target sound collection distance is located behind human 200. Accordingly, target movement information 300b is not presented. Target movement information that indicates that human 200 is currently present at an appropriate destination may be further presented. For example, light may be projected such that a message "OK" is displayed on the ground in front of human 200.

As shown in FIG. 13C, when human 200 moves to a position between unmanned aerial vehicle 100 and the position of the prohibited approach distance, the position of the target sound collection distance and the position of the prohibited approach distance are located behind human 200.

Accordingly, target movement information 300*b* and target movement information 300*c* are not presented. Here, human 200 is too close to unmanned aerial vehicle 100, and thus safety may not be ensured. Accordingly, processor 101 may present target movement information 300*h* that informs that human 200 should move away from unmanned aerial vehicle 100. As shown in FIG. 13C, target movement information 300*h* is, for example, an arrow indicating a direction in which human 200 should moves away from unmanned aerial vehicle 100. Human 200 can recognize human 200 should move away from unmanned aerial vehicle 100 by viewing target movement information 300*h*.

Figure 14A:
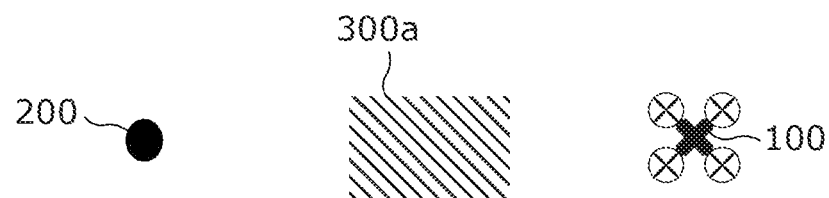
FIG. 14A is a diagram illustrating a second example of a method for presenting the target movement information according to the position of the human.
Figure 14B:
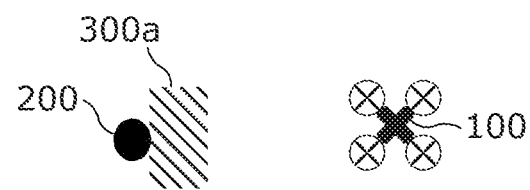
FIG. 14B is a diagram illustrating the second example of the method for presenting the target movement information according to the position of the human.

FIGS. 14A and 14B are diagrams illustrating a second example of the method for presenting the target movement information according to the position of human 200.

As described with reference to FIG. 6, target movement information 300*a* may be light projected by light emitter 106*a* onto the ground in the region that corresponds to the destination where the quality of the voice of human 200 reaches a targeted quality level or a level higher than the targeted quality level and safety of human 200 is ensured. Also, as described with reference to FIGS. 13A to 13C, even when the target movement information is information that indicates the region, the target movement information may not be presented behind human 200 depending on the position of human 200.

As shown in FIG. 14A, when there is a large distance between human 200 and unmanned aerial vehicle 100, the region that extends from a position spaced apart from unmanned aerial vehicle 100 by the prohibited approach distance and is within the target sound collection distance is located between human 200 and unmanned aerial vehicle 100, and thus target movement information 300*a* is presented in front of human 200.

When human 200 arrives at the destination located between the position of the target sound collection distance and the position of the prohibited approach distance, as shown in FIG. 14B, a portion of target movement information 300*a* is positioned behind human 200, and thus that portion is not presented. In order to inform that human 200 is currently present at the appropriate destination, the configuration of target movement information 300*a* may be changed between when human 200 has not arrived at the destination and when human 200 has arrived at the destination.

Figure 15A:
FIG. 15A is a diagram illustrating a third example of a method for presenting the target movement information according to the position of the human.
Figure 15B:
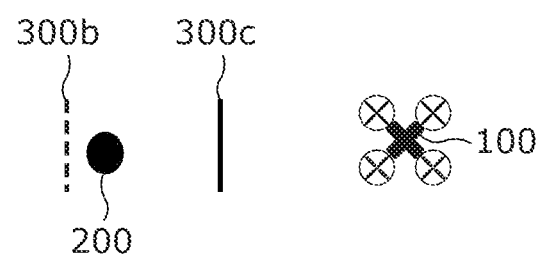
FIG. 15B is a diagram illustrating the third example of the method for presenting the target movement information according to the position of the human
Figure 15C:
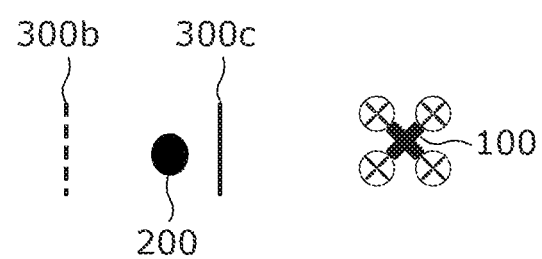
FIG. 15C is a diagram illustrating the third example of the method for presenting the target movement information according to the position of the human.

FIGS. 15A to 15C are diagrams illustrating a third example of the method for presenting the target movement information according to the position of human 200. In FIGS. 15A to 15C, target movement information 300*b* and target movement information 300*c* that are indicated by dotted lines mean that target movement information 300*b* and target movement information 300*c* are not displayed, and do not mean that target movement information 300*b* and target movement information 300*c* displayed as dotted lines.

For example, when both target movement information 300*b* and target movement information 300*c* are presented, human 200 may not be able to decide in which direction human 200 should move. To address this, either one of target movement information 300*b* and target movement information 300*c* may be presented depending on the position of human 200.

As shown in FIG. 15A, when there is a large distance between human 200 and unmanned aerial vehicle 100, by human 200 moving at least to the position at which target movement information 300*b* is presented, the quality of collected sound can be improved while ensuring safety of human 200. Accordingly, in this case, target movement information 300*c* is not presented. With this configuration, it is possible to suppress a situation where human 200 accidentally moves to the position at which target movement information 300*c* is presented. If there is a position at which the quality of collected sound can be improved more and safety can be ensured more, as compared with the position at which target movement information 300*b* is presented (or in other words, the position of the target sound collection distance), the target movement information may be presented at that position.

As shown in FIG. 15B, when human 200 arrives at the destination located between the position of the target sound collection distance and the position of the prohibited approach distance, target movement information 300*c* is presented so as to prevent human 200 from moving beyond the prohibited approach distance and approaching unmanned aerial vehicle 100. Also, at this time, target movement information 300*b* is no longer presented.

Target movement information 300*c* may not be presented even when human 200 arrives at the destination located between the position of the target sound collection distance and the position of the prohibited approach distance. This is because if new target movement information 300*c* is presented immediately after human 200 has moved beyond the position of the target sound collection distance, human 200 may mistakenly move beyond the position indicated by target movement information 300*c*. Accordingly, for example, as shown in FIG. 15C, target movement information 300*c* may be presented when human 200 further approaches unmanned aerial vehicle 100 and arrives near the position of the prohibited approach distance. With this configuration, because target movement information 300*c* is not presented immediately, it is possible to save power.

Figure 16A:
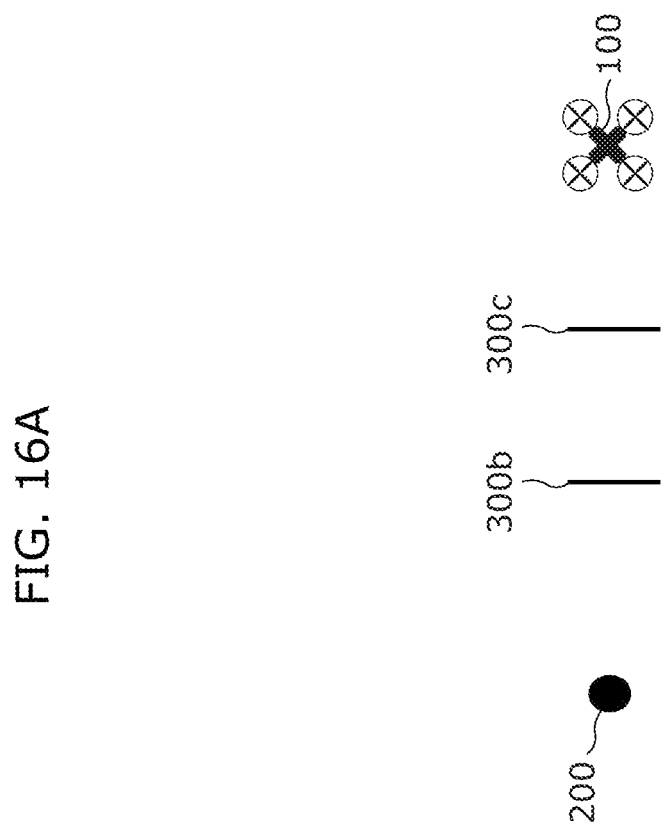
FIG. 16A is a diagram illustrating a fourth example of a method for presenting the target movement information according to the position of the human.

FIGS. 16A and 16B are diagrams illustrating a fourth example of the method for presenting the target movement information according to the position of human 200.

For example, human 200 may not always move straight toward unmanned aerial vehicle 100 from the current position even when the target movement information is presented. For example, in the case where there is an obstacle between human 200 and unmanned aerial vehicle 100, or there is no route for human 200 to move straight toward unmanned aerial vehicle 100, human 200 may, for example, take a detour to approach unmanned aerial vehicle 100. Accordingly, the location where the target movement information is presented may be changed according to the position of human 200.

As shown in FIG. 16A, it is assumed that target movement information 300*b* and target movement information 300*c* are presented between human 200 and unmanned aerial vehicle 100.

Then, as shown in FIG. 16B, when human 200 moves in a direction different from the direction in which unmanned aerial vehicle 100 is present, rather than moving straight toward unmanned aerial vehicle 100, target movement information 300*b* and target movement information 300*c* are presented over again between the position of human 200 to which human 200 has moved and unmanned aerial vehicle 100. With this configuration, it is possible to present the target movement information optimal for the position of human 200 to which human 200 has moved.

Figure 17:
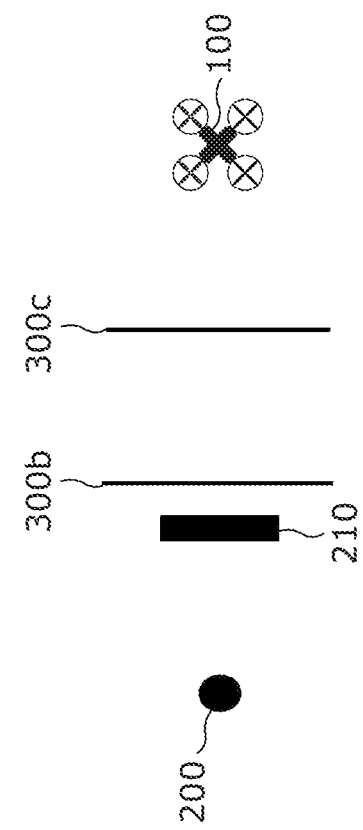
FIG. 17 is a diagram illustrating a fifth example of a method for presenting the target movement information according to the position of the human.

FIG. 17 is a diagram illustrating a fifth example of the method for presenting the target movement information according to the position of human 200.

For example, in the case where there is obstacle 210 (a wall, a groove, or the like) between human 200 and unmanned aerial vehicle 100, human 200 may take a detour to approach unmanned aerial vehicle 100. In this case, the configuration of presenting the target movement information may be changed according to the position of human 200.

As shown in FIG. 17, when human 200 is at a position from which human 200 cannot move straight toward unmanned aerial vehicle 100 due to the presence of obstacle 210, processor 101 generates, for example, a route that guides human 200 to unmanned aerial vehicle 100 while avoiding obstacle 210. Then, as shown in FIG. 17, processor 101 changes the configuration of target movement information 300b and target movement information 300c such that target movement information 300b and target movement information 300c are also presented on that route. Specifically, processor 101 presents target movement information 300b and target movement information 300c over a wide range. With this configuration, the target movement information can be presented based on a prediction that human 200 will move while avoiding obstacle 210.

Figure 18A:
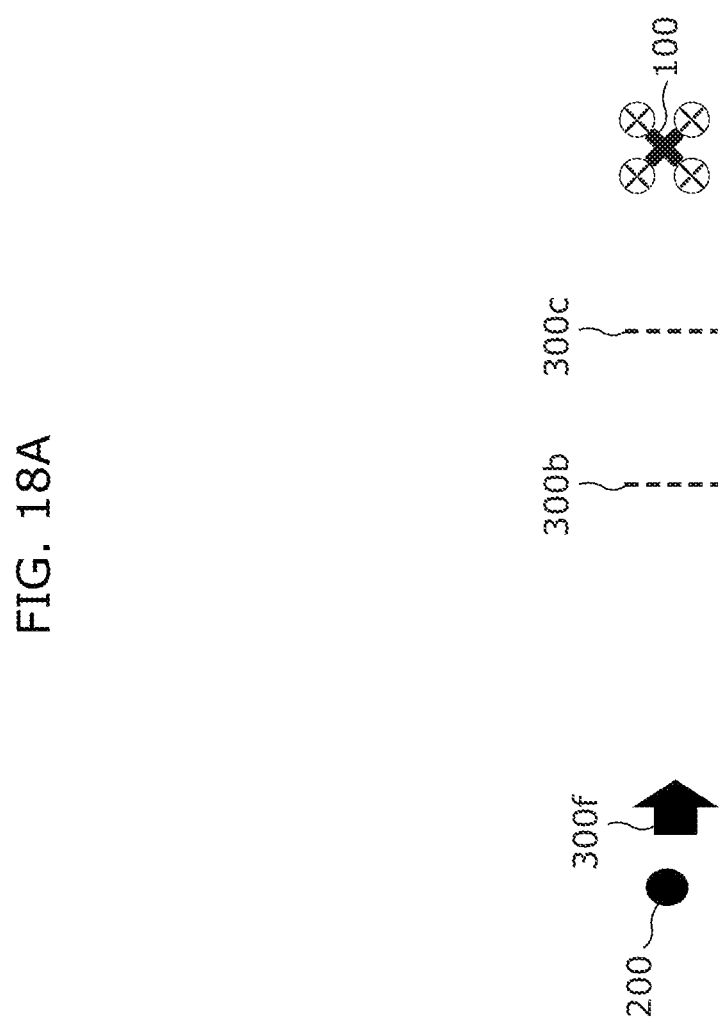
FIG. 18A is a diagram illustrating a sixth example of a method for presenting the target movement information according to the position of the human.
Figure 18B:
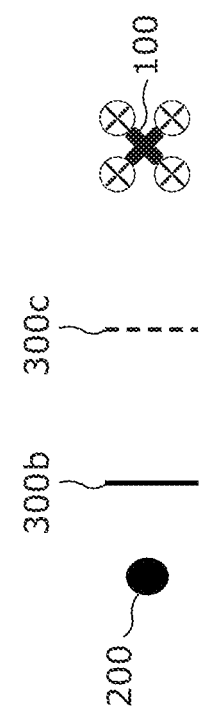
FIG. 18B is a diagram illustrating the sixth example of the method for presenting the target movement information according to the position of the human.

FIGS. 18A and 18B are diagrams illustrating a sixth example of the method for presenting the target movement information according to the position of human 200. In FIGS. 18A and 18B, target movement information 300b and target movement information 300c that are indicated by dotted lines mean that mean that target movement information 300b and target movement information 300c are not displayed, and do not mean that target movement information 300b and target movement information 300c are displayed as dotted lines.

For example, when the distance from human 200 to each of the position of the target sound collection distance and the position of the prohibited approach distance is large (for example, when human 200 is spaced apart by several tens meters or more), human 200 may not visually recognize target movement information 300b and target movement information 300c.

Accordingly, as shown in FIG. 18A, when there is a large distance between human 200 and the position of the target sound collection distance, target movement information 300b and target movement information 300c are not presented. However, in this case, human 200 may not be able to decide in which direction human 200 should move, and thus target movement information 300f indicating the direction of movement from the current position of human 200 to the destination, which was described with reference to FIG. 9, is presented. Then, as shown in FIG. 18B, when human 200 moves closer to the position of the target sound collection distance and the distance from human 200 to the position of the target sound collection distance is within a predetermined distance (for example, several meters), target movement information 300b is presented. At this time, target movement information 300f is no longer presented. With this configuration, human 200 is guided to the destination by target movement information 300f, and when human 200 moves closer to the destination, target movement information 300b is presented, and thus human 200 can recognize the destination.

Figure 19B:
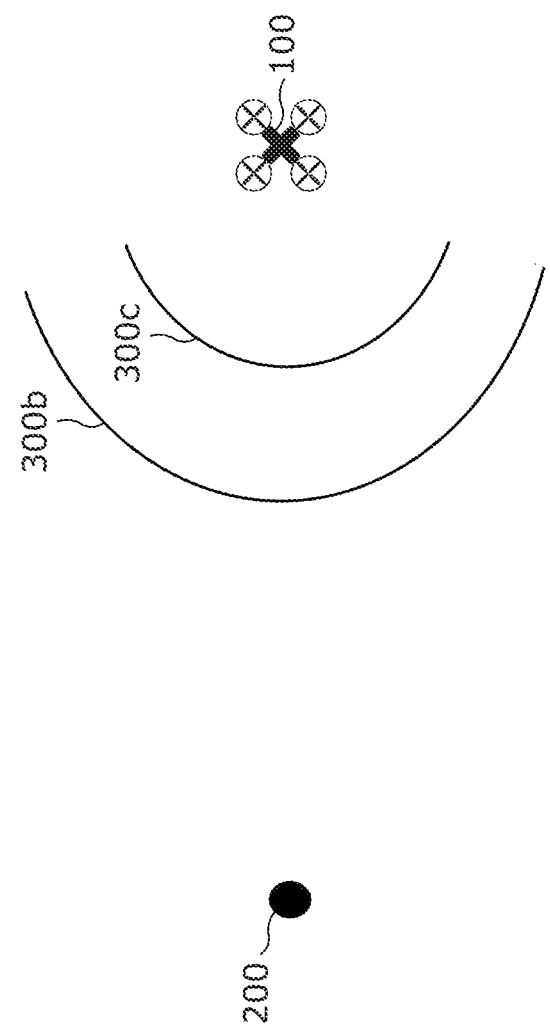
FIG. 19B is a diagram illustrating the seventh example of the method for presenting the target movement information according to the position of the human.

FIGS. 19A and 19B are diagrams illustrating a seventh example of the method for presenting the target movement information according to the position of human 200.

For example, the number of routes that can be taken by human 200 to approach unmanned aerial vehicle 100 increases as the distance between human 200 and unmanned aerial vehicle 100 increases. In other words, the number of routes that can be taken by human 200 to approach unmanned aerial vehicle 100 decreases as the distance between human 200 and unmanned aerial vehicle 100 decreases.

Accordingly, as shown in FIG. 19A, when the distance between human 200 and unmanned aerial vehicle 100 is short, target movement information 300b and target movement information 300c are presented in a narrow range. On the other hand, when there is a large distance between human 200 and unmanned aerial vehicle 100, as shown in FIG. 19B, target movement information 300b and target movement information 300c are presented over a wide range. With this configuration, in the case where there is a large distance between human 200 and unmanned aerial vehicle 100, even when human 200 approaches unmanned aerial vehicle 100 via various routes, human 200 can be guided to the destination by target movement information 300b and target movement information 300c that are presented over a wide range.

Figure 20:
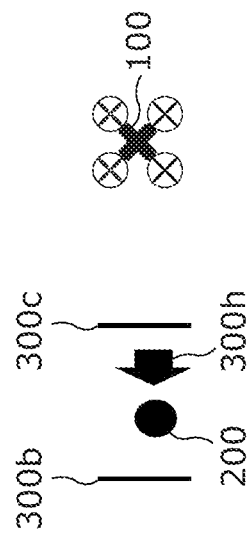
FIG. 20 is a diagram illustrating an eighth example of a method for presenting the target movement information according to the position of the human.

FIG. 20 is a diagram illustrating an eighth example of the method for presenting the target movement information according to the position of human 200.

For example, even when human 200 has moved beyond the position of the prohibited approach distance, but does not approach unmanned aerial vehicle 100, from the viewpoint of safety, human 200 may be positioned as far away as possible from unmanned aerial vehicle 100.

Accordingly, as shown in FIG. 20, when the quality of the voice of human 200 is higher than a predetermined targeted quality level, processor 101 presents target movement information 300h informing that human 200 should move away from unmanned aerial vehicle 100, which was described with reference to FIG. 13C. Accordingly, when the quality of the voice of human 200 is higher than the targeted quality level, and the quality of collected sound is sufficient, by informing human 200 to move away from unmanned aerial vehicle 100, safety can be further enhanced. In FIG. 20, target movement information 300b and target movement information 300c are presented, but they do not necessarily need to be presented. For example, when the quality of the voice of human 200 is higher than the targeted quality level, and human 200 further approaches unmanned aerial vehicle 100, only target movement information 300c may be presented.

Figure 21:
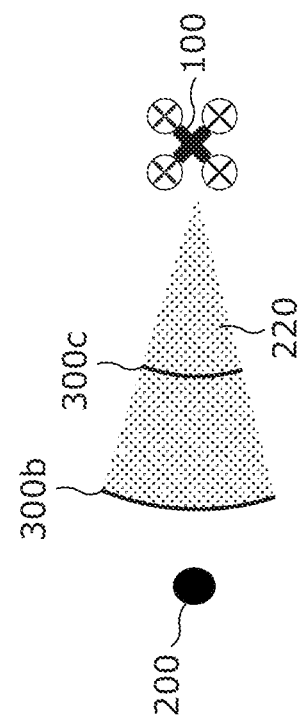
FIG. 21 is a diagram illustrating an example of a method for presenting the target movement information according to the range of directivity of a microphone.

The method for presenting the target movement information may be changed according to the range of directivity of microphone 105. This will be explained with reference to FIG. 21. FIG. 21 is a diagram showing human 200 and unmanned aerial vehicle 100 as viewed from above.

FIG. 21 is a diagram illustrating an example of a method for presenting the target movement information according to directivity range 220 of microphone 105.

For example, when the destination of human 200 is outside directivity range 220 of microphone 105 even after human 200 has approached unmanned aerial vehicle 100, it is difficult to improve the quality of collected sound. To address this, as shown in FIG. 21, target movement information 300b and target movement information 300c are presented within directivity range 220 such that human 200 can move to a position that is within directivity range 220 of microphone 105 and is between the position of the target sound collection distance and the position of the prohibited approach distance. With this configuration, the quality of collected sound can be improved.

As the method for guiding human 200 to the destination, light projected onto the ground, a sound, or the like is used, but light or a sound may not be easily recognized by human 200 depending on the environment of the surroundings of unmanned aerial vehicle 100. To address this, processor 101 may recognize the environment, and present the target movement information by using a presentation means suitable for the environment.

For example, human 200 may not be able to visually recognize the light projected onto the ground in a bright place. To address this, for example, processor 101 recognizes the environment (light) by using image sensor 107, and determines whether or not the light projected onto the ground is recognizable. If it is determined that the light is recognizable, processor 101 guides human 200 to the destination by projecting light onto the ground. If it is determined that the light is not recognizable, processor 101 guides human 200 to the destination by, for example, outputting a sound from speaker 106b or light from light emitter 106a (LED). Processor 101 may recognize the environment (illuminance) by using an illuminance sensor, and determine whether or not the illuminance of the ground onto which light is projected is greater than a predetermined threshold value. If it is determined that the illuminance is less than or equal to the predetermined threshold value, processor 101 guides human 200 to the destination by projecting light onto the ground. If it is determined that the illuminance is greater than the predetermined threshold value, processor 101 guides human 200 to the destination by, for example, outputting a sound from speaker 106b or light from light emitter 106a (LED).

Also, for example, human 200 may not be able to easily hear an output sound in a noisy place. To address this, for example, processor 101 recognizes the environment (noise) by using microphone 105, and determines whether or not noise is greater than a predetermined threshold value. If noise is less than or equal to the predetermined threshold value, processor 101 guides human 200 to the destination by outputting a sound from speaker 106b. If noise is greater than the predetermined threshold value, processor 101 guides human 200 to the destination by, for example, using the light output from light emitter 106a, or projecting light onto the ground.

The presentation means may be determined in advance according to the place, time, or the like. That is, the presentation means that projects light onto the ground may be determined in advance, for example, for the case where unmanned aerial vehicle 100 is used in a place such as indoor and the case where unmanned aerial vehicle 100 is used at a night time. Also, for example, for the case where unmanned aerial vehicle 100 is used in a place such as outside and the case where unmanned aerial vehicle 100 is used in a day time, the presentation means that outputs light from light emitter 106a (LED) or the presentation means that outputs a sound from speaker 106b may be determined in advance.

As described above, there is a presentation means that cannot be easily recognized by human 200 depending on the environment. By presenting the target movement information by using the presentation means suitable for the environment, human 200 can easily recognize the target movement information.

[4. Voice Volume Change]

For example, processor 101 may present voice volume change information that prompts human 200 to change the voice volume (or in other words, the loudness of the voice), in addition to presenting the target movement information that prompts human 200 to move to the destination. This will be described with reference to FIGS. 22A and 22B.

Figure 22A:
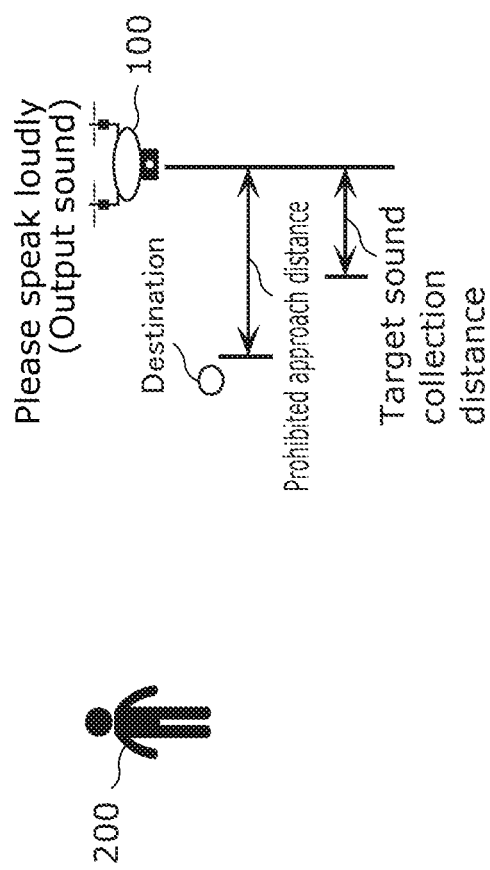
FIG. 22A is a diagram showing an example of a state when the unmanned aerial vehicle according to the embodiment presents voice volume change information.
Figure 22B:
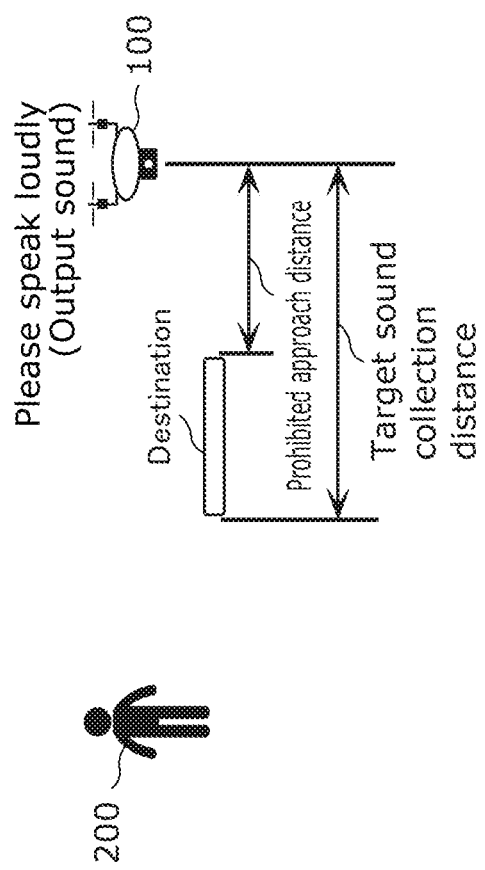
FIG. 22B is a diagram showing another example of a state when the unmanned aerial vehicle according to the embodiment presents voice volume change information.

FIG. 22A is a diagram showing an example of a state when unmanned aerial vehicle 100 according to the embodiment presents voice volume change information. FIG. 22B is a diagram showing another example of the state when unmanned aerial vehicle 100 according to the embodiment presents voice volume change information.

For example, there may be a case where the target sound collection distance is less than the prohibited approach distance because human 200 speaks in a small voice. In this case, it is highly likely that the quality of the voice of human 200 remains lower than the targeted quality level even after human 200 has moved to the destination. Accordingly, when the quality of the voice of human 200 remains lower than the targeted quality level even after human 200 has moved to the destination, processor 101 presents voice volume change information that prompts human 200 to change the voice volume. The voice volume change information may be, for example, a sound that says "please speak loudly". The voice volume change information is presented, for example, at the timing when it is determined that the quality of collected sound is not sufficient after the target movement information has been presented and human 200 has arrived at the destination. However, the timing is not limited thereto. For example, the voice volume change information may be presented at the same timing as when the target movement information is presented. Also, in the case where human 200 speaks in a small voice, the voice volume change information may be presented before the target movement information is presented, and then the target sound collection distance may be calculated according to the voice of human 200 after human 200 has changed the voice volume, and determine the destination again.

Also, for example, even when the target sound collection distance is greater than the prohibited approach distance, there may be a case where human 200 stops moving toward the destination before arriving at the destination such as when human 200 feels scared of unmanned aerial vehicle 100. In this case, it is highly likely that the quality of the voice of human 200 is lower than the targeted quality level. Accordingly, when human 200 cannot move toward the destination, processor 101 presents voice volume change information that prompts human 200 to change the voice volume. However, human 200 may already understand that, in order to improve the quality of collected sound, he/she needs to speak loudly because he/she has not arrived at the destination. In this case, human 200 may feel annoyed at the voice volume change information presented, despite the fact that human 200 already understands that he/she needs to speak loudly. For this reason, processor 101 may present the voice volume change information when the quality of the voice of human 200 decreases to a level lower than the targeted quality level after human 200 has stopped moving.

As described above, when the quality of collected sound is lower than the targeted quality level despite the fact that human 200 has moved to the destination, or when the quality of collected sound is lower than the targeted quality level because human 200 cannot move toward the destination, by prompting human 200 to change the voice volume, the quality of collected sound can be improved.

Other Embodiments

Up to here, unmanned aerial vehicle 100 according to one or more aspects of the present disclosure has been described above, but the present disclosure is not limited to the embodiment given above. Other embodiments obtained by making various modifications that can be conceived by a person having ordinary skill in the art to the above embodiment as well as embodiments constructed by combining structural elements of different embodiments without departing from the scope of the present disclosure are also encompassed within the scope of the one or more aspects of the present disclosure.

For example, human 200 may feel scared of unmanned aerial vehicle 100 when unmanned aerial vehicle 100 moves closer to human 200. For this reason, unmanned aerial vehicle 100 may be controlled to not move while human 200 is moving toward the destination. For example, unmanned aerial vehicle 100 may ignore an instruction to move transmitted from the controller while human 200 is moving toward the destination. By doing so, human 200 can move to the destination without anxiety.

Also, for example, when human 200 approaches unmanned aerial vehicle 100 beyond the position of the prohibited approach distance, unmanned aerial vehicle 100 may move backward to increase the distance to human 200. Then, unmanned aerial vehicle 100 may guide human 200 to move away from the position by the prohibited approach distance or more, from where unmanned aerial vehicle 100 has moved backward.

Also, for example, in the embodiment given above, unmanned aerial vehicle 100 includes both light emitter 106a and speaker 106b. However, unmanned aerial vehicle 100 may include only either one of light emitter 106a and speaker 106b. Also, unmanned aerial vehicle 100 does not necessarily need to include both light emitter 106a and speaker 106b. For example, in the case where unmanned aerial vehicle 100 does not include light emitter 106a and speaker 106b, processor 101 may cause a presentation device provided external to unmanned aerial vehicle 100 to present the target movement information through communication, or may display the target movement information on a display panel or the like included in unmanned aerial vehicle 100.

Also, for example, in the embodiment given above, unmanned aerial vehicle 100 includes both image sensor 107 and distance measuring sensor 108. However, unmanned aerial vehicle 100 does not necessarily need to include both image sensor 107 and distance measuring sensor 108, and may include only either one of image sensor 107 and distance measuring sensor 108.

Also, for example, unmanned aerial vehicle 100 may further include an actuator that changes at least either one of the direction of microphone 105 and the amount of protrusion of microphone 105 from unmanned aerial vehicle 100 to the outside. When the quality of the target sound (the voice of human 200) is lower than the targeted quality level even after the sound source (human 200) has moved to the destination, processor 101 may control the actuator to change at least either one of the direction of microphone 105 and the amount of protrusion of microphone 105.

With this configuration, by changing the direction of microphone 105 or the amount of protrusion of microphone 105, the quality of collected sound can be improved without, for example, prompting human 200 to further move toward the destination or to change the voice volume. By causing microphone 105 to protrude toward the outside, the distance of microphone 105 from the motor or the propeller that generates noise can be increased, and thus the SN ratio can be improved.

Also, for example, the destination may be determined by taking into consideration the environment of the surroundings such as the intensity of the wind, the direction of the wind, and an obstacle. It is possible to more safely collect sound by extending the prohibited approach distance, prompting the sound source to increase the voice volume rather than prompting the sound source to approach unmanned aerial vehicle 100, or determining the destination such that unmanned aerial vehicle 100 is not on the windward side, according to the environment of the surroundings.

Also, for example, the altitude of unmanned aerial vehicle 100 may be lowered before prompting the sound source of the target sound to move toward the destination. By doing so, it is possible to eliminate the anxiety for moving toward the destination from the sound source of the target sound.

Also, for example, after prompting the sound source of the target sound to move toward the destination, unmanned aerial vehicle 100 may inform the sound source of the target sound, by using a sound or light, that unmanned aerial vehicle 100 will not move. By doing so, the sound source of the target sound can move to the destination without anxiety.

Also, for example, the present disclosure can be implemented not only as unmanned aerial vehicle 100, but also as an information processing method that includes steps (processing operations) performed by the structural elements of unmanned aerial vehicle 100.

As shown in FIG. 2, the information processing method is an information processing method that is performed by processor 101 included in unmanned aerial vehicle 100 that includes: sensor 120 including at least microphone 105 that generates sound data; and processor 101. The information processing method includes: determining a quality of a target sound by using the sound data generated by microphone 105 (step S11); acquiring a positional relationship between unmanned aerial vehicle 100 and a sound source of the target sound by using data generated by sensor 120 (step S12); determining a destination to which the sound source is to move based on the quality of the target sound and the positional relationship (step S13); and presenting target movement information that prompts the sound source to move toward the destination (step S14).

Also, the present disclosure can be implemented as a program for causing processor 101 to execute the steps of the information processing method. Furthermore, the present disclosure can be implemented as a computer readable non-transitory recording medium, such as a CD-ROM, in which the program is recorded.

For example, in the case where the present disclosure is implemented as a program (software), the steps of the information processing method are performed by the program being executed by using hardware resources including a CPU, a memory, an input/output circuit, and the like included in a computer. That is, the steps of the information processing method are performed by the CPU acquiring data from the memory, the input/output circuit, or the like to perform computation, and outputting the result of computation to the memory, the input/output circuit, or the like.

In the embodiment given above, the structural elements included in unmanned aerial vehicle 100 may be configured by dedicated hardware or may be implemented by executing a software program suitable for the structural elements. The structural elements may be implemented by a program executor such as a CPU or a processor reading and executing the software program recorded in a recording medium such as a hard disk or a semiconductor memory.

Some or all of the functions of unmanned aerial vehicle 100 according to the embodiment is typically implemented as an LSI that is an integrated circuit. They may be configured as individual single chips, or some or all of them may be configured in a single chip. Also, implementation of an integrated circuit is not limited to an LSI, and may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Also, some or all of the functions of unmanned aerial vehicle 100 according to the embodiment described above may be implemented by a processor such as a CPU executing a program.

Also, some or all of the functions of unmanned aerial vehicle 100 according to the embodiment described above may be implemented by being executed by an external server.

Also, unmanned aerial vehicle 100 according to the embodiment described above may fly autonomously based on a predetermined program.

Also, all of the numerical values used above are merely given as examples to specifically describe the present disclosure, and thus the present disclosure is not limited to the numerical values given as examples.

Also, the order in which the steps of the information processing method are performed is merely given as an example to specifically describe the present disclosure, and thus the steps may be performed in any order other than the order described above as long as the same effects can be obtained. Also, some of the steps may be performed simultaneously with (for example, in parallel to) other steps.

Furthermore, variations obtained by making various modifications that can be conceived by a person having ordinary skill in the art to the above embodiment of the present disclosure without departing from the gist of the present disclosure are also encompassed within the scope of the present disclosure.

INDUSTRIAL APPLICABILITY

The present disclosure is applicable to, for example, an unmanned aerial vehicle that is used as a communication tool.

The invention claimed is:

1. An unmanned aerial vehicle, comprising:
   a sensor including at least a microphone that collects a target sound that is a sound from a sound source and generates sound data of the target sound collected; and
   a processor,
   wherein the processor performs:
   determining a quality of the target sound by using the sound data generated by the microphone;
   acquiring a positional relationship between the unmanned aerial vehicle and the sound source of the target sound by using data generated by the sensor, the positional relationship including a distance between the unmanned aerial vehicle and the sound source and a first position of the sound source relative to the unmanned aerial vehicle, the first position being a position of the sound source at which the target sound corresponding to the sound data is collected;
   determining, by using the quality of the target sound determined and the distance measured, a target distance between the unmanned aerial vehicle and the sound source, the target distance being for collecting a target sound having a targeted quality level that is predetermined;
   determining a destination to which the sound source is to move based on (i) the quality of the target sound determined, (ii) the target distance determined, (iii) a predetermined distance to be maintained between the unmanned aerial vehicle and the sound source, and (iv) the positional relationship; and
   presenting target movement information that prompts the sound source to move toward the destination,
   wherein when the target distance is longer than or equal to the predetermined distance and the quality of the target sound is lower than the targeted quality level, in the determining of the destination, the processor determines, as the destination, a second position closer to the unmanned aerial vehicle than the first position is to, or
   when the target distance is shorter than the predetermined distance, in determining the destination, the processor determines, as the destination, a third position spaced apart from the unmanned aerial vehicle by the predetermined distance.

2. The unmanned aerial vehicle according to claim 1, wherein the processor further performs:
   acquiring, from a memory of the unmanned aerial vehicle, distance information that indicates the predetermined distance from the unmanned aerial vehicle.

3. The unmanned aerial vehicle according to claim 1, wherein the unmanned aerial vehicle further includes an actuator that changes at least one of a direction of the microphone and an amount of protrusion of the microphone from the unmanned aerial vehicle to outside, and
   when the quality of the target sound is lower than the targeted quality level even after the sound source has moved to the destination, the processor changes at least one of the direction of the microphone and the amount of protrusion of the microphone.

4. The unmanned aerial vehicle according to claim 1, wherein, when the quality of the target sound is lower than the targeted quality level that is predetermined even after the sound source has moved to the destination, or when the sound source cannot move toward the destination, the processor presents voice volume change information that prompts the sound source to change a voice volume.

5. The unmanned aerial vehicle according to claim 1, wherein, when the quality of the target sound is higher than the targeted quality level that is predetermined, in determining the destination, the processor determines, as the destination, a fourth position farther from the unmanned aerial vehicle than the first position is from.

6. The unmanned aerial vehicle according to claim 1, wherein the destination includes a position or a region where the quality of the target sound after the sound source has moved to the destination reaches the targeted quality level that is predetermined or a level higher than the targeted quality level.

7. The unmanned aerial vehicle according to claim 6, wherein the destination includes a position or a region where the quality of the target sound after the sound source has moved to the destination reaches the targeted quality level that is predetermined or a level higher than the targeted quality level, the position or the region being spaced apart from the unmanned aerial vehicle by a predetermined distance.

8. The unmanned aerial vehicle according to claim 1, wherein the target movement information includes information for guiding the sound source to the destination.

9. The unmanned aerial vehicle according to claim 8, wherein the target movement information includes information that indicates a direction of movement from a current position of the sound source to the destination.

10. The unmanned aerial vehicle according to claim 8, wherein the target movement information includes information that indicates a moving route to the destination of the sound source.

11. The unmanned aerial vehicle according to claim 8, wherein the target movement information includes information that indicates whether or not the sound source has moved to the destination.

12. The unmanned aerial vehicle according to claim 1, wherein the processor causes a presentation device that is provided external to the unmanned aerial vehicle to present the target movement information through communication.

13. The unmanned aerial vehicle according to claim 1, wherein the processor recognizes an environment and presents the target movement information by using a presentation means suitable for the environment.

14. The unmanned aerial vehicle according to claim 1, wherein the sensor further includes an image sensor that generates image data, and
the processor acquires the positional relationship by using the image data.

15. The unmanned aerial vehicle according to claim 1, wherein the sensor further includes a distance measuring sensor that generates distance measurement data, and
the processor acquires the positional relationship by using the distance measurement data.

16. The unmanned aerial vehicle according to claim 1, wherein the positional relationship is at least one of a distance between the unmanned aerial vehicle and the sound source and a position of the sound source relative to the unmanned aerial vehicle.

17. An information processing method that is used by an unmanned aerial vehicle that includes: a sensor including at least a microphone that collects a target sound that is a sound from a sound source and generates sound data of the target sound collected; and a processor, the information processing method causing the processor to execute processing that includes:
   determining a quality of the target sound by using the sound data generated by the microphone;
   acquiring a positional relationship between the unmanned aerial vehicle and the sound source of the target sound by using data generated by the sensor, the positional relationship including a distance between the unmanned aerial vehicle and the sound source and a first position of the sound source relative to the unmanned aerial vehicle, the first position being a position of the sound source at which the target sound corresponding to the sound data is collected;
   determining, by using the quality of the target sound determined and the distance measured, a target distance between the unmanned aerial vehicle and the sound source, the target distance being for collecting a target sound having a targeted quality level that is predetermined;
   determining a destination to which the sound source is to move based on (i) the quality of the target sound determined, (ii) the target distance determined, (iii) a predetermined distance to be maintained between the unmanned aerial vehicle and the sound source, and (iv) the positional relationship; and
   presenting target movement information that prompts the sound source to move toward the destination,
   wherein when the target distance is longer than or equal to the predetermined distance and the quality of the target sound is lower than the targeted quality level, in the determining of the destination, a second position is determined as the destination, the second position being closer to the unmanned aerial vehicle than the first position is to, or
   when the target distance is shorter than the predetermined distance, in the determining of the destination, a third position is determined as the destination, the third position being spaced apart from the unmanned aerial vehicle by the predetermined distance.

18. A non-transitory computer-readable recording medium having a computer program recorded thereon for causing the processor to execute the information processing method according to claim 17.

* * * * *